US012588015B2

(12) United States Patent
Xu et al.

(10) Patent No.: US 12,588,015 B2
(45) Date of Patent: Mar. 24, 2026

(54) HYBRID AUTOMATIC REPEAT REQUEST IDENTIFIER DETERMINATION ASSOCIATED WITH CROSS-LINK INTERFERENCE MEASUREMENTS

(71) Applicant: QUALCOMM Incorporated, San Diego, CA (US)

(72) Inventors: Huilin Xu, Temecula, CA (US); Ahmed Abdelaziz Ibrahim Abdelaziz Zewail, San Diego, CA (US); Muhammad Sayed Khairy Abdelghaffar, San Jose, CA (US)

(73) Assignee: Qualcomm Incorporated, San Diego, CA (US)

( * ) Notice: Subject to any disclaimer, the term of this patent is extended or adjusted under 35 U.S.C. 154(b) by 446 days.

(21) Appl. No.: 18/174,162

(22) Filed: Feb. 24, 2023

(65) Prior Publication Data
US 2024/0292400 A1    Aug. 29, 2024

(51) Int. Cl.
*H04W 72/12*        (2023.01)
*H04L 1/1812*        (2023.01)
(Continued)

(52) U.S. Cl.
CPC ........... *H04W 72/12* (2013.01); *H04L 1/1812* (2013.01); *H04L 5/14* (2013.01); *H04W 24/10* (2013.01); *H04W 72/232* (2023.01)

(58) Field of Classification Search
CPC ... H04W 72/12; H04W 24/10; H04W 72/232;

H04L 1/1812; H04L 5/14; H04L 5/0055; H04L 1/1864; H04L 1/1896; H04L 1/1887; H04L 1/1822; H04B 17/318; H04B 17/345
See application file for complete search history.

(56) References Cited

U.S. PATENT DOCUMENTS

2022/0060265 A1* 2/2022 Xu ......................... H04W 24/10
2022/0346104 A1* 10/2022 Yi .......................... H04L 1/1614
(Continued)

OTHER PUBLICATIONS

International Search Report and Written Opinion—PCT/US2024/012576—ISA/EPO—May 2, 2024.
(Continued)

*Primary Examiner* — Kwang B Yao
*Assistant Examiner* — Patrick Yipao Pei
(74) *Attorney, Agent, or Firm* — Harrity & Harrity, LLP

(57) ABSTRACT
Various aspects of the present disclosure generally relate to wireless communication. Various aspects relate generally to hybrid automatic repeat request (HARQ) identifier determination associated with cross-link interference (CLI) measurements. Some aspects more specifically relate to handling of HARQ identifier determinations for communications that are dropped due to collision with a CLI measurement. In some aspects, a user equipment (UE) and/or a network node may skip an increment of a value of a HARQ identifier for communications that are dropped due to collisions with CLI measurements. Where the scheduling information indicates or is associated with a single HARQ identifier, the UE and/or the network node may not increment the HARQ identifier for communications, from the multiple communications, that are dropped because of a collision with a CLI measurement.

30 Claims, 11 Drawing Sheets

(51) Int. Cl.
  *H04L 5/14* (2006.01)
  *H04W 24/10* (2009.01)
  *H04W 72/232* (2023.01)

(56) References Cited

U.S. PATENT DOCUMENTS

2023/0062724 A1* 3/2023 Zhou ..................... H04L 1/1864
2025/0112737 A1* 4/2025 Zhou ..................... H04L 1/1861

OTHER PUBLICATIONS

Qualcomm Incorporate: "Capacity Enhancement Techniques for XR", 3GPP TSG RAN WG1 #112, R1-2301431, 3rd Generation Partnership Project (3GPP), Mobile Competence Centre, 650, Route Des Lucioles, F-06921 Sophia-Antipolis Cedex, France, vol. 3GPP RAN 1, No. Athens, GR, Feb. 27, 2023-Mar. 3, 2023, Feb. 17, 2023, 11 Pages, pp. 3,4.

\* cited by examiner

300

500

Network
Node(s)
110

UE
120

505
Capability report

510
Configuration information
-CLI configuration
-Semi-static communication configuration 515
Scheduling information associated with multiple
communications 520
Identify or determine a HARQ
identifier associated with the multiple
communications 525
Detect that a communication, from
the multiple communications, is to
be dropped 530
Skip an increment the HARQ
identifier for the dropped
communication 535
Communicate one or more of the multiple communications
associated with respective HARQ identifiers

FIGURE 5

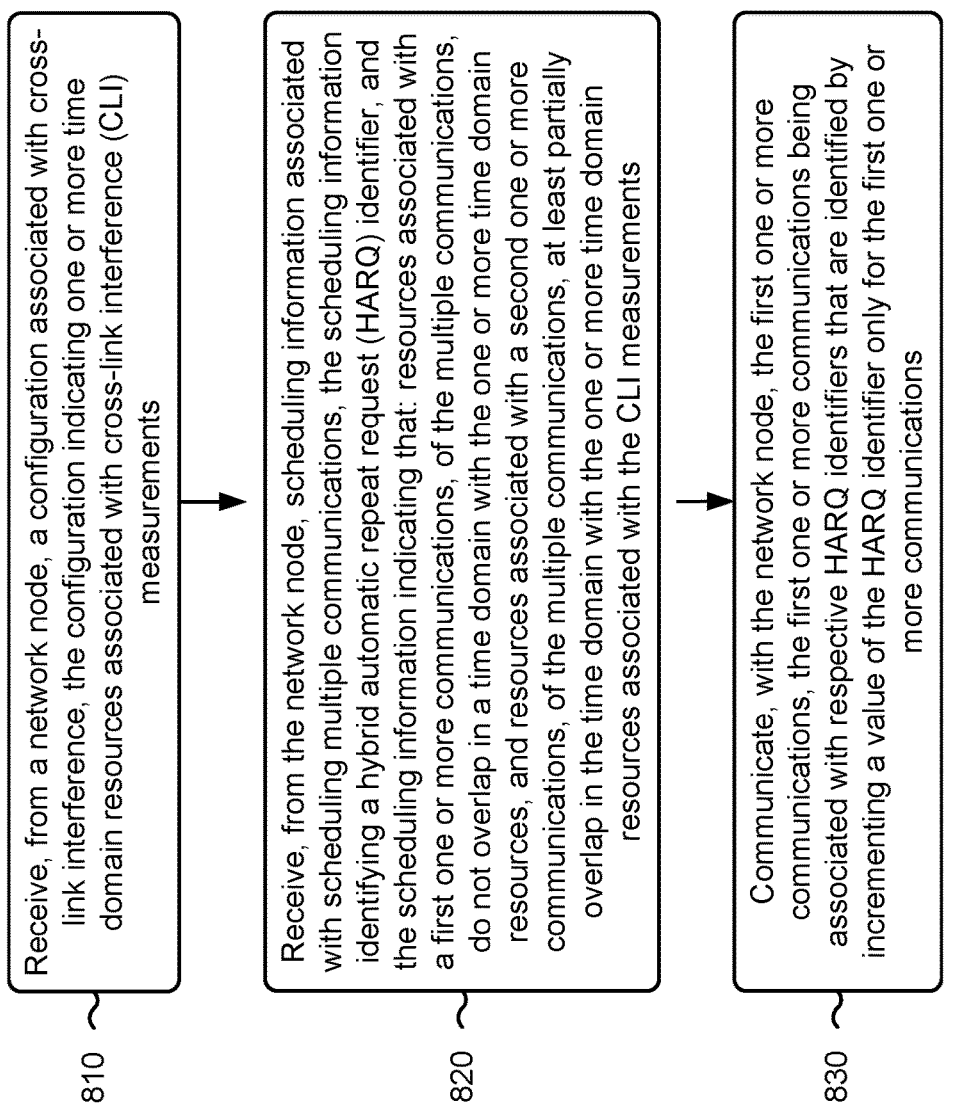

800

810

Receive, from a network node, a configuration associated with cross-link interference, the configuration indicating one or more time domain resources associated with cross-link interference (CLI) measurements

820

Receive, from the network node, scheduling information associated with scheduling multiple communications, the scheduling information identifying a hybrid automatic repeat request (HARQ) identifier, and the scheduling information indicating that: resources associated with a first one or more communications, of the multiple communications, do not overlap in a time domain with the one or more time domain resources, and resources associated with a second one or more communications, of the multiple communications, at least partially overlap in the time domain with the one or more time domain resources associated with the CLI measurements

830

Communicate, with the network node, the first one or more communications, the first one or more communications being associated with respective HARQ identifiers that are identified by incrementing a value of the HARQ identifier only for the first one or more communications

FIGURE 8

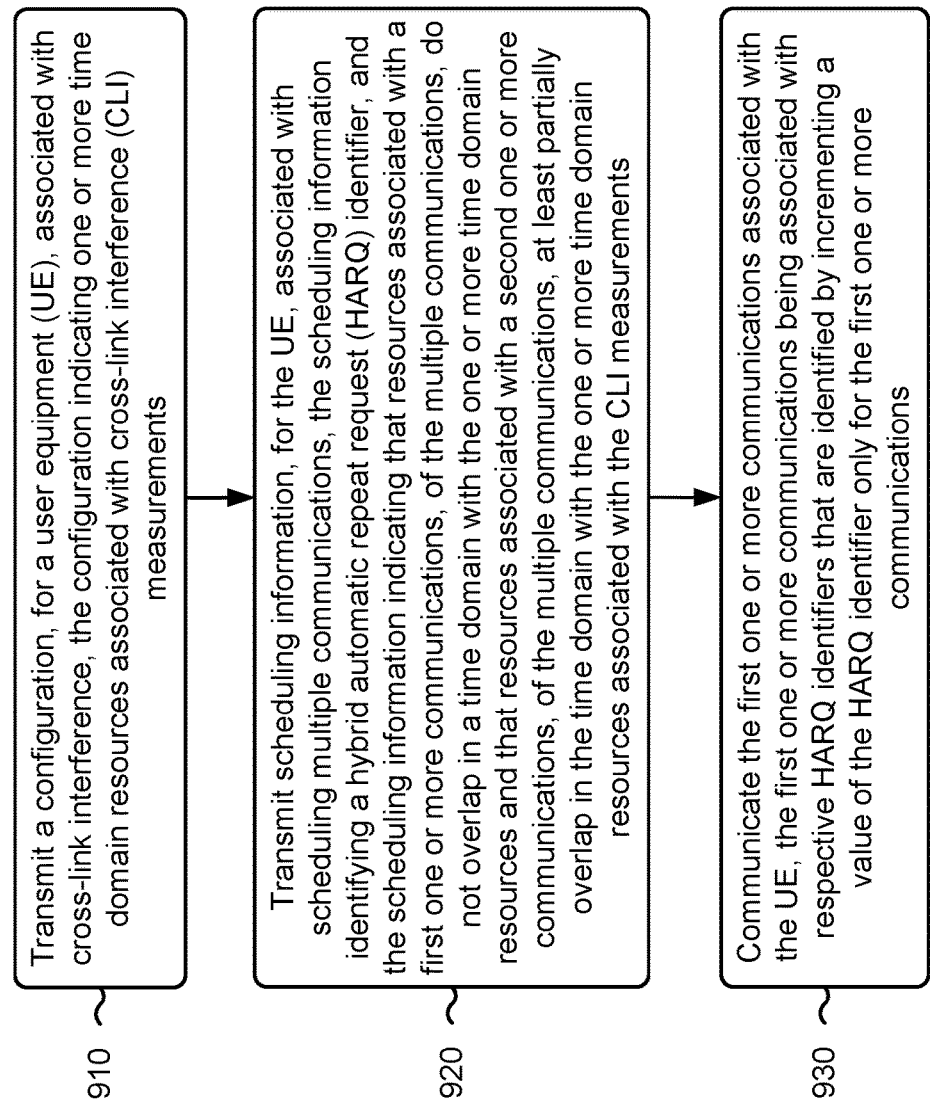

Transmit a configuration, for a user equipment (UE), associated with cross-link interference, the configuration indicating one or more time domain resources associated with cross-link interference (CLI) measurements

910

Transmit scheduling information, for the UE, associated with scheduling multiple communications, the scheduling information identifying a hybrid automatic repeat request (HARQ) identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements

920

Communicate the first one or more communications associated with the UE, the first one or more communications being associated with respective HARQ identifiers that are identified by incrementing a value of the HARQ identifier only for the first one or more communications

HYBRID AUTOMATIC REPEAT REQUEST IDENTIFIER DETERMINATION ASSOCIATED WITH CROSS-LINK INTERFERENCE MEASUREMENTS

FIELD OF THE DISCLOSURE

Aspects of the present disclosure generally relate to wireless communication and specifically, to techniques and apparatuses associated with hybrid automatic repeat request (HARQ) identifier determination associated with cross-link interference (CLI) measurements.

BACKGROUND

Wireless communication systems are widely deployed to provide various telecommunication services, such as telephony, video, data, messaging, and broadcasts. Typical wireless communication systems may employ multiple-access technologies capable of supporting communication with multiple users by sharing available system resources (for example, bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

A hybrid automatic repeat request (HARQ) process refers to a retransmission protocol in which a receiver checks for errors in received data and, if an error is detected, then the receiver buffers the received data and requests a retransmission from a transmitter. A HARQ receiver is then able to combine the buffered received data with retransmitted data prior to channel decoding and error detection, which improves performance of the retransmission. Multiple HARQ processes can be used to avoid the round trip time having an impact on throughput. That is, other HARQ processes may transfer data while a given HARQ process is waiting for an acknowledgment.

In some examples, a receiver (for example, a user equipment (UE)) may apply or assign the HARQ identifier to a first scheduled communication in time. For example, the UE may increment the indicated HARQ identifier to determine HARQ identifiers for other communications scheduled by the scheduling information. This reduces a size of the scheduling information and reduces signaling overhead associated with scheduling multiple communications using a single communication. Synchronization of HARQ identifier between a transmitter and a receiver is important for ensuring that a HARQ process can be performed accurately. For example, a UE or a network node may use the HARQ identifier to track or identify data in a buffer to enable the UE or the network node to retransmit the data and/or to combine the buffered data with retransmitted data. If the HARQ identifier is incorrectly assigned or tracked, then the UE or the network node may retransmit incorrect data and/or may attempt to combine buffered data with unrelated retransmitted data. This may cause errors in decoding and/or receiving the data. Additionally, incorrectly assigning or tracking the HARQ identifier may cause subsequent HARQ identifiers that are based on, or otherwise associated with, (for example, incremented from) the HARQ identifier to also be incorrect.

In some examples, a communication (for example, from multiple communications that are scheduled by a single downlink control information (DCI) communication or other scheduling information) may be dropped for reasons (for example, other than being associated with a slot or symbol that is associated with a conflicting communication direction) that are not associated with high risks of missed detections (for example, uplink dynamic signaling, as described in more detail elsewhere herein). For example, a UE may drop (for example, not transmit or receive) a communication based on, or otherwise associated with, a configured cross-link interference (CLI) measurement resource. CLI in wireless communications refers to the scenario in which two or more wireless links that are operating at similar frequencies and/or in close proximity to each other interfere with each other, causing degradation in the performance of the individual links. However, if the dropped communication is a communication that is co-scheduled with multiple communications, then the UE and the network node may not be synchronized in a handling of HARQ identifiers associated with the multiple communications.

SUMMARY

Some aspects described herein relate to a user equipment (UE) for wireless communication. The UE may include at least one memory and at least one processor communicatively coupled with the at least one memory. The at least one processor may be operable to cause the UE to receive, from a network node, a configuration associated with cross-link interference, the configuration indicating one or more time domain resources associated with cross-link interference (CLI) measurements. The at least one processor may be operable to cause the UE to receive, from the network node, scheduling information associated with scheduling multiple communications, the scheduling information identifying a hybrid automatic repeat request (HARQ) identifier, and the scheduling information indicating that resources associated with a first one or more communications, of the multiple communications, do not overlap in a time domain with the one or more time domain resources, and resources associated with a second one or more communications, of the multiple communications, at least partially overlap in the time domain with the one or more time domain resources associated with the CLI measurements. The at least one processor may be operable to cause the UE to communicate, with the network node, the first one or more communications, the first one or more communications being associated with respective HARQ identifiers that are identified by incrementing a value of the HARQ identifier only for the first one or more communications.

Some aspects described herein relate to a network node for wireless communication. The network node may include at least one memory and at least one processor communicatively coupled with the at least one memory. The at least one processor may be operable to cause the network node to transmit a configuration, for a UE, associated with cross-link interference, the configuration indicating one or more time domain resources associated with CLI measurements. The at least one processor may be operable to cause the network node to transmit scheduling information, for the UE, associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements. The at least one processor may be operable to cause the network node to communicate the first one or more communications associated with the UE, the first one or more communications being associated with respective HARQ identifiers that are identified by incrementing a value of the HARQ identifier only for the first one or more communications.

Some aspects described herein relate to a method of wireless communication performed by a UE. The method may include receiving, from a network node, a configuration associated with cross-link interference, the configuration indicating one or more time domain resources associated with CLI measurements. The method may include receiving, from the network node, scheduling information associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements. The method may include communicating, with the network node, the first one or more communications, the first one or more communications being associated with respective HARQ identifiers that are identified by incrementing a value of the HARQ identifier only for the first one or more communications.

Some aspects described herein relate to a method of wireless communication performed by a network node. The method may include transmitting a configuration, for a UE, associated with cross-link interference, the configuration indicating one or more time domain resources associated with CLI measurements. The method may include transmitting scheduling information, for the UE, associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements. The method may include communicating the first one or more communications associated with the UE, the first one or more communications being associated with respective HARQ identifiers that are identified by incrementing a value of the HARQ identifier only for the first one or more communications.

Some aspects described herein relate to a non-transitory computer-readable medium that stores a set of instructions for wireless communication by a UE. The set of instructions, when executed by one or more processors of the UE, may cause the UE to receive, from a network node, a configuration associated with cross-link interference, the configuration indicating one or more time domain resources associated with CLI measurements. The set of instructions, when executed by one or more processors of the UE, may cause the UE to receive, from the network node, scheduling information associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements. The set of instructions, when executed by one or more processors of the UE, may cause the UE to communicate, with the network node, the first one or more communications, the first one or more communications being associated with respective HARQ identifiers that are identified by incrementing a value of the HARQ identifier only for the first one or more communications.

Some aspects described herein relate to a non-transitory computer-readable medium that stores a set of instructions for wireless communication by a network node. The set of instructions, when executed by one or more processors of the network node, may cause the network node to transmit a configuration, for a UE, associated with cross-link interference, the configuration indicating one or more time domain resources associated with CLI measurements. The set of instructions, when executed by one or more processors of the network node, may cause the network node to transmit scheduling information, for the UE, associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements. The set of instructions, when executed by one or more processors of the network node, may cause the network node to communicate the first one or more communications associated with the UE, the first one or more communications being associated with respective HARQ identifiers that are identified by incrementing a value of the HARQ identifier only for the first one or more communications.

Some aspects described herein relate to an apparatus for wireless communication. The apparatus may include means for receiving, from a network node, a configuration associated with cross-link interference, the configuration indicating one or more time domain resources associated with CLI measurements. The apparatus may include means for receiving, from the network node, scheduling information associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements. The apparatus may include means for communicating, with the network node, the first one or more communications, the first one or more communications being associated with respective HARQ identifiers that are identified by incrementing a value of the HARQ identifier only for the first one or more communications.

Some aspects described herein relate to an apparatus for wireless communication. The apparatus may include means for transmitting a configuration, for a UE, associated with cross-link interference, the configuration indicating one or more time domain resources associated with CLI measurements. The apparatus may include means for transmitting scheduling information, for the UE, associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements. The apparatus may include means for communicating the first one or more communications associated with the UE, the first one or more communications being associated with respective HARQ identifiers that are identified by incrementing a value of the HARQ identifier only for the first one or more communications.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 5 is a diagram of an example associated with hybrid automatic repeat request (HARQ) identifier determinations associated with CLI measurements in accordance with the present disclosure.

FIG. 8 is a flowchart illustrating an example process performed, for example, by a UE that supports HARQ identifier determinations associated with CLI measurements in accordance with the present disclosure.

FIG. 9 is a flowchart illustrating an example process performed, for example, by a network node that supports HARQ identifier determinations associated with CLI measurements in accordance with the present disclosure.

DETAILED DESCRIPTION

Figure 1:
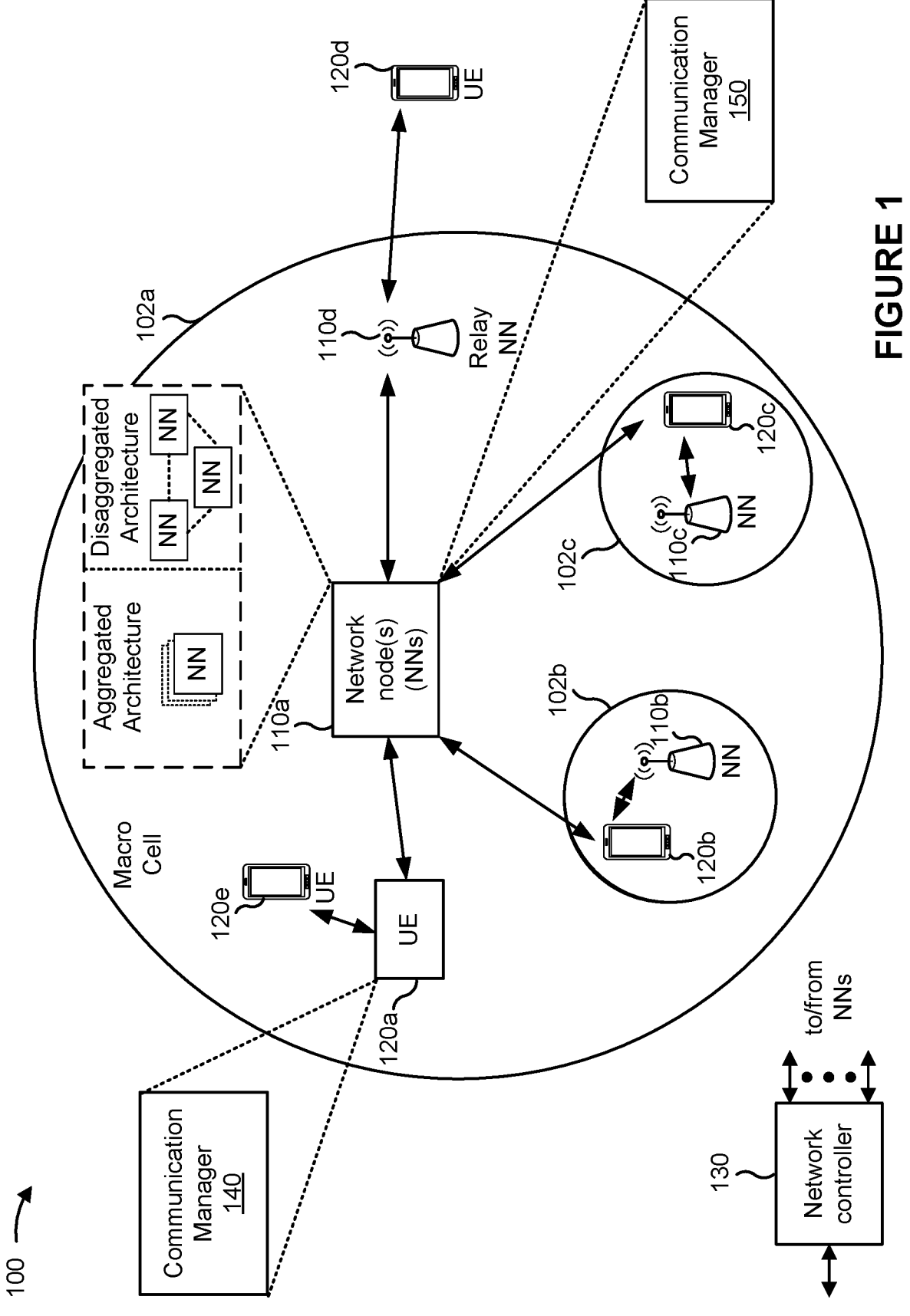
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

In some examples, one or more restrictions may be configured and/or defined (for example, by a wireless communication standard) associated with communications that overlap with or that occur near, in the time domain, cross-link interference (CLI) user equipment (UE) behavior for collisions between a scheduled communication and a CLI measurement. The one or more scheduling availability restrictions may define valid communications and invalid communications. A "valid" communication may be a scheduled or configured communication that is available (for example, that the UE is expected to receive or transmit). An "invalid" communication or a "restricted" communication may be a communication that is unavailable (for example, that the UE is not expected to receive or transmit), such as indicated by the one or more scheduling availability restrictions. A UE may drop (for example, refrain from transmitting or receiving) an invalid communication or a restricted communication.

However, if the dropped communication is a communication that is co-scheduled with multiple communications, then the UE and the network node may not be synchronized in a handling of hybrid automatic repeat request (HARQ) identifiers associated with the multiple communications. For example, handling of incrementing or determining HARQ identifiers for the multiple communications when a communication is dropped due to a collision with a CLI measurement is not defined. Therefore, the UE and the network node may perform different operations (for example, incrementing or not incrementing) for the HARQ identifier associated with a communication that is dropped due to at least partially overlapping in the time domain with resources associated with a CLI measurement. This may cause errors associated with the HARQ processes for the dropped communication and for other communications included in the multiple communications. Additionally, this may cause the UE and the network node to needlessly use or apply HARQ identifiers for the dropped communication.

Various aspects relate generally to HARQ identifier determination associated with CLI measurements. Some aspects more specifically relate to handling of HARQ identifier determinations for communications that are dropped (for example, not transmitted or received) due to an overlap, in the time domain, with a CLI measurement. For example, the dropped communication may be a communication that is scheduled with multiple communications, such as via a single downlink control information (DCI) communication or as part of another semi-static configuration, such as a semi-persistent scheduling (SPS) configuration or a configured grant (CG) configuration. In some aspects, a UE and/or a network node may drop (for example, may not be expected to receive or transmit) a communication because time domain resources of the communication at least partially overlap with time domain resources associated with a CLI measurement (for example, with CLI measurement resources and/or a time gap associated with the CLI measurement). In some aspects, the UE and/or the network node may refrain from incrementing value of a HARQ identifier for communications that are dropped due to collisions (for example, in the time domain) with CLI measurements. In other words, for scheduling information associated with scheduling multiple communications where the scheduling information indicates or is associated with a single HARQ identifier, the UE and/or the network node may not increment the HARQ identifier for communications, from the multiple communications, that are dropped because of a collision (for example, in the time domain) with a CLI measurement.

Particular aspects of the subject matter described in this disclosure can be implemented to realize one or more of the following potential advantages. In some examples, the described techniques can be used to synchronize a handling of HARQ identifier determinations between a UE and a network node when communications are dropped (for example, not transmitted or received) because of a collision with a CLI measurement. This ensures that there is no misalignment between the UE and the network node for the HARQ identifiers, ensures that there is not an over-dimensioning of HARQ identifiers (for example, HARQ identifiers are not assigned to communications or occasions that are not actually transmitted or received), and ensures that HARQ identifiers are continuously used by the UE and the network node, thereby reducing a complexity and simplifying a management of the HARQ processes, among other examples.

FIG. 1 is a diagram illustrating an example of a wireless network in accordance with the present disclosure. The wireless network 100 may be or may include elements of a 5G (for example, NR) network or a 4G (for example, Long Term Evolution (LTE)) network, among other examples. The wireless network 100 may include one or more network nodes 110 (shown as a network node (NN) 110a, a network node 110b, a network node 110c, and a network node 110d), a UE 120 or multiple UEs 120 (shown as a UE 120a, a UE 120b, a UE 120c, a UE 120d, and a UE 120e), or other network entities. A network node 110 is an entity that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110)

may include multiple network nodes, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, and/or a RAN node. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

Each network node 110 may provide communication coverage for a particular geographic area. In the Third Generation Partnership Project (3GPP), the term "cell" can refer to a coverage area of a network node 110 or a network node subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and May allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node.

The wireless network 100 may be a heterogeneous network that includes network nodes 110 of different types, such as macro network nodes, pico network nodes, femto network nodes, or relay network nodes. These different types of network nodes 110 may have different transmit power levels, different coverage areas, or different impacts on interference in the wireless network 100. For example, macro network nodes may have a high transmit power level (for example, 5 to 40 watts) whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), and/or a Non-Real Time (Non-RT) RIC. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

A network controller 130 may couple to or communicate with a set of network nodes 110 and may provide coordination and control for these network nodes 110. The network controller 130 may communicate with the network nodes 110 via a backhaul communication link. The network nodes 110 may communicate with one another directly or indirectly via a wireless or wireline backhaul communication link. In some aspects, the network controller 130 may be a CU or a core network device, or the network controller 130 may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network node, or any other suitable device that is configured to communicate via a wireless medium.

A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHz-114.25 GHZ), and FR5 (114.25 GHZ-300 GHz). Each of these higher frequency bands falls within the EHF band.

With the above examples in mind, unless specifically stated otherwise, the term "sub-6 GHZ," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may receive, from a network node, a configuration associated with cross-link interference, the configuration indicating one or more time domain resources associated with CLI measurements; receive, from the network node, scheduling information associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements; and communicate, with the network node, the first one or more communications, the first one or more communications being associated with respective HARQ identifiers that are identified by incrementing a value of the HARQ identifier only for the first one or more communications. Additionally, or alternatively, the communication manager 140 may perform one or more other operations described herein.

In some aspects, the network node 110 may include a communication manager 150. As described in more detail elsewhere herein, the communication manager 150 may transmit a configuration, for a UE, associated with cross-link interference, the configuration indicating one or more time domain resources associated with CLI measurements; transmit scheduling information, for the UE, associated with scheduling multiple communications, the scheduling information identifying a HARQ identifier, and the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements; and communicate the first one or more communications associated with the UE, the first one or more communications being associated with respective HARQ identifiers that are identified by incrementing a value of the HARQ identifier only for the first one or more communications. Additionally, or alternatively, the communication manager 150 may perform one or more other operations described herein.

Figure 2:
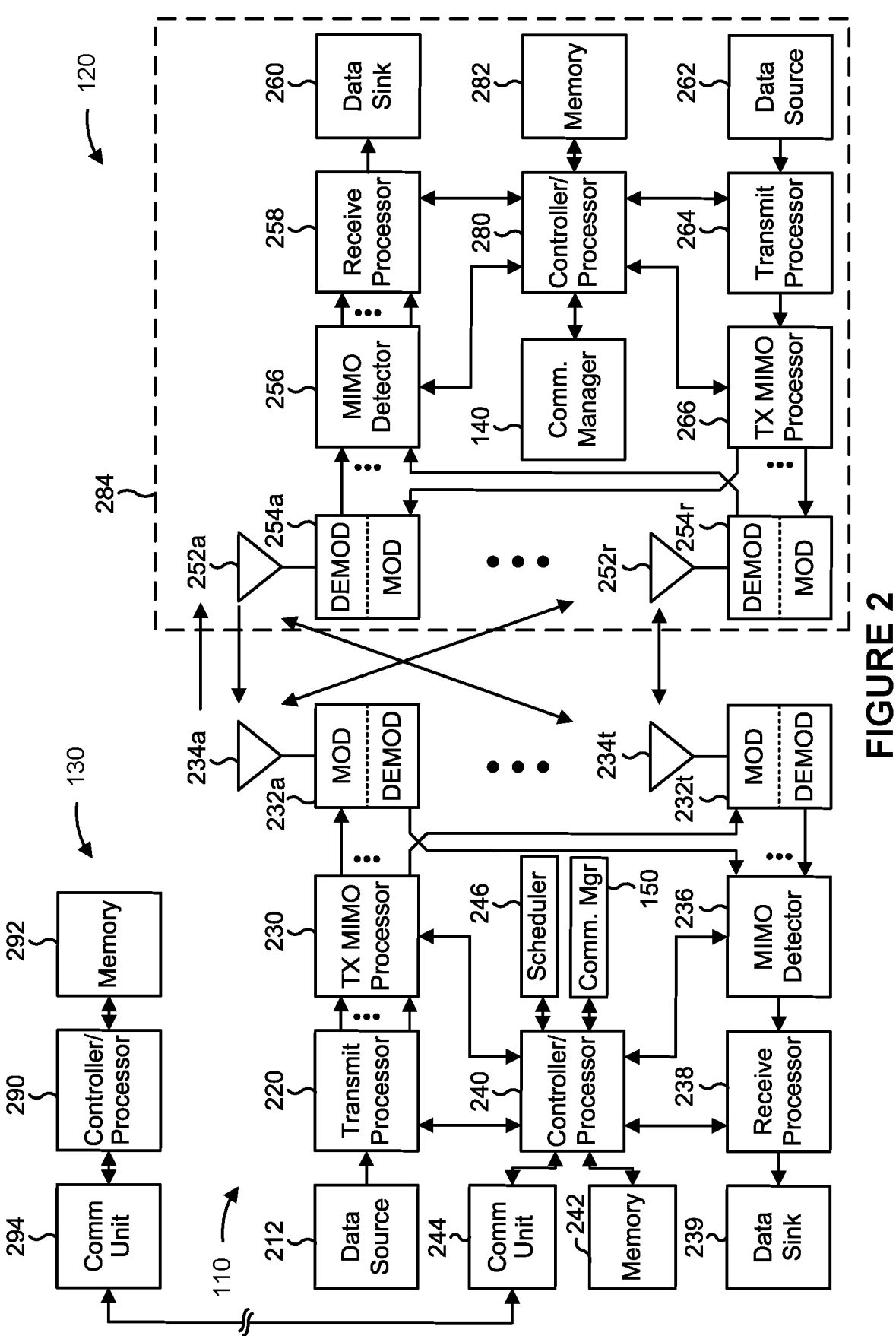
FIG. 2 is a diagram illustrating an example network node in communication with a user equipment (UE) in a wireless network in accordance with the present disclosure.

FIG. 2 is a diagram illustrating an example network node in communication with a UE in a wireless network in accordance with the present disclosure. The network node may correspond to the network node 110 of FIG. 1. Similarly, the UE may correspond to the UE 120 of FIG. 1. The network node 110 may be equipped with a set of antennas 234a through 234t, such as T antennas (T≥1). The UE 120 may be equipped with a set of antennas 252a through 252r, such as R antennas (R≥1). The network node 110 of depicted in FIG. 2 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. The term "controller/processor" may refer to one or more controllers and/or one or more processors. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. In some examples, the modem 254 of the UE 120 may include a modulator and a demodulator. In some examples, the UE 120 includes a transceiver. The transceiver may include any combination of the antenna(s) 252, the modem (s) 254, the MIMO detector 256, the receive processor 258, the transmit processor 264, or the TX MIMO processor 266. The transceiver may be used by a processor (for example, the controller/processor 280) and the memory 282 to perform aspects of any of the methods described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the methods described herein.

The controller/processor 240 of the network node 110, the controller/processor 280 of the UE 120, or any other component(s) of FIG. 2 may perform one or more techniques associated with HARQ identifier determination associated with CLI measurements, as described in more detail elsewhere herein. For example, the controller/processor 240 of the network node 110, the controller/processor 280 of the UE 120, or any other component(s) of FIG. 2 may perform or direct operations of, for example, process 800 of FIG. 8, process 900 of FIG. 9, and/or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 800 of FIG. 8, process 900 of FIG. 9, and/or other processes as described herein. In some examples, executing instructions may include running the instructions, converting the instructions, compiling the instructions, or interpreting the instructions, among other examples.

In some aspects, the UE 120 includes means for receiving, from a network node, a configuration associated with cross-link interference, the configuration indicating one or more time domain resources associated with CLI measurements; means for receiving, from the network node, scheduling information associated with scheduling multiple communications, the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements, and the scheduling information associated with a HARQ identifier; and/or means for communicating, with the network node, the first one or more communications, the first one or more communications being associated with respective HARQ identifiers that are identified by incrementing a value of the HARQ identifier only for the first one or more communications. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node 110 includes means for transmitting a configuration, for a UE, associated with cross-link interference, the configuration indicating one or more time domain resources associated with CLI measurements; means for transmitting scheduling information, for the UE, associated with scheduling multiple communications, the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements, and the scheduling information associated with a HARQ identifier; and/or means for communicating the first one or more communications associated with the UE, the first one or more communications being associated with respective HARQ identifiers that are identified by incrementing a value of the HARQ identifier only for the first one or more communications. The means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
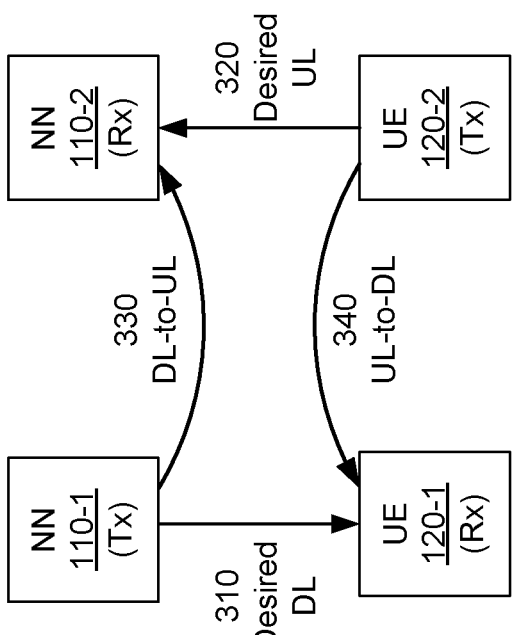
FIG. 3 is a diagram illustrating an example associated with cross-link interference (CLI) detection and mitigation in accordance with the present disclosure.

FIG. 3 is a diagram illustrating an example associated with CLI detection and mitigation 300 in accordance with the present disclosure. In dynamic time division duplexing (TDD), the allocation of network resources to uplink and downlink may be dynamically modified depending on a traffic load. For example, a network node (NN) 110 may configure a TDD configuration (for example, a TDD pattern) with more uplink transmission time intervals (TTIs) (for example, frames, subframes, slots, mini-slots, and/or symbols) for a UE 120 when the UE 120 has uplink data to transmit, and may configure a TDD configuration with more downlink TTIs for the UE 120 when the UE 120 has downlink data to receive. The TDD configuration may be dynamically configured to modify the allocation of uplink TTIs and downlink TTIs used for communication between the network node 110 and the UE 120.

As shown in FIG. 3, when neighboring network nodes 110 use different TDD configurations to communicate with UEs 120, this may result in a downlink communication 310 between a first network node 110-1 and a first UE 120-1 in a same TTI as an uplink communication 320 between a second network node 110-2 and a second UE 120-2. These communications in different transmission directions (for example, downlink vs. uplink) in the same TTI may interfere with one another, which may be referred to as CLI.

For example, in a first operation 330, the first network node 110-1 may transmit, and the second network node 110-2 may receive, the downlink communication 310. The reception of the downlink communication 310 may cause interference (for example, CLI), at the second network node 110-2, with reception, by the second network node 110-2, of the uplink communication 320 from the second UE 120-2. This may be referred to as downlink-to-uplink (DL-to-UL) interference, network node to network node interference, or gNB-to-gNB interference, among other examples.

Further, as in a second operation 340, the second UE 120-2 may transmit, and the first UE 120-1 may receive, the uplink communication 320. The reception of the uplink communication 320 by the first UE 120-1 may cause interference (for example, CLI), at the first UE 120-1, with the downlink communication 310 from the first network node 110-1. This may be referred to as uplink-to-downlink (UL-to-DL) interference or UE-to-UE interference, among other examples. This UE-to-UE interference may occur and/or may increase when the first UE 120-1 and the second UE 120-2 are in close proximity, and may be avoided or mitigated by preventing scheduling of the UEs 120 in different transmission directions in the same TTI. In some examples, UE-to-UE interference may occur between UEs in the same cell (for example, communicating with the same network node, rather than different network nodes as shown in FIG. 3).

In some examples, a UE 120 (for example, the first UE 120-1 and/or the second UE 120-2) may be configured to measure and/or report measurement of CLI. For example, CLI may be measured to facilitate and/or improve full-duplex operations at a network node 110 and/or at a UE 120. "Full-duplex communication" in a wireless network refers to simultaneous bi-directional communication between devices in the wireless network. For example, a UE 120 or network node 110 operating in a full-duplex mode may transmit an uplink communication and receive a downlink communication at the same time (for example, in the same slot or the same symbol). "Half-duplex communication" in a wireless network refers to unidirectional communications (for example, only downlink communication or only uplink communication) between devices at a given time (for example, in a given slot or a given symbol). For example, for full-duplex communications, a downlink bandwidth part (BWP) and an uplink BWP may be active at the same time (for example, using the same, or at least partially overlapping, time domain resources). The downlink and uplink transmissions may occur in overlapping bands (for example, in-band full-duplex (IBFD)) or in adjacent bands (for example, subband full-duplex (SBFD)). In a given downlink and uplink slot symbol, a half-duplex UE 120 may either transmit in an uplink band or receive in a downlink band. In a given downlink and uplink slot symbol, a full-duplex UE 120 may transmit in an uplink band and/or receive in a downlink band (for example, in the same slot). Because of full-duplex operations, a UE 120 and/or a network node 110 may experience CLI, in a similar manner as described elsewhere herein.

CLI measurement and reporting may be associated with a dynamic/flexible TDD, and/or common for both the SBFD mode and the dynamic/flexible TDD. The CLI measurement and reporting may be associated with a measurement resource/reporting configuration, measurement/reporting information (for example, including UE processing delay), a relevant information exchange (for example, between network nodes), and/or a usage of measurements at a network node. Other mechanisms for a network node to network node (for example, gNB-to-gNB) CLI handling or a UE-to-UE CLI handling for SBFD may be defined.

A UE 120 may be configured to explicitly report CLI measurements, such as CLI-RSRP measurements and/or CLI-RSSI measurements, among other examples. The UE 120 may report CLI based at least in part on an explicit CLI reporting (for example, the UE 120 may report explicit CLI measurements, such as the CLI-RSRP measurements and/or CLI-RSSI measurements). In a CLI framework, the UE 120 may perform a layer 3 (L3) CLI reporting based at least in part on a periodic measurement resource (for example, a periodic CLI measurement resource). As used herein, a "CLI measurement resource" may refer to time domain resources, frequency domain resources, and/or spatial domain resources to be measured by a UE 120. In an adaptive L3 CLI framework, the UE 120 may perform an L3 CLI reporting based at least in part on an adaptive periodic measurement resource. In a layer 2 (L2) CLI framework, the UE 120 may perform an L2 CLI reporting (for example, via an uplink MAC control element (MAC-CE)) based at least in part on a semi-persistent or persistent measurement resource. In a layer 1 (L1) CLI framework, the UE 120 may perform an L1 CLI reporting (for example, via a physical uplink shared channel (PUSCH) or a physical uplink control channel (PUCCH)) based at least in part on an aperiodic, semi-persistent, or periodic measurement resource. As the UE 120 moves between the CLI framework, the adaptive L3 CLI framework, the L2 CLI framework, and the L1 CLI framework, the UE 120 may be provided with an increased configuration flexibility and an adaptation to a dynamic CLI.

In some examples, one or more restrictions may be configured and/or defined (for example, by a wireless communication standard, such as the 3GPP) associated with communications that overlap with or that occur near, in the time domain, CLI UE behavior for collisions between a scheduled communication and a CLI measurement. As used herein, a "collision" or resources "colliding" may refer to a first one or more radio resources (for example, associated with a communication) and a second one or more radio resources (for example, associated with a CLI measurement) at least partially overlapping in the time domain. For example, 3GPP Technical Specification (TS) Version 17.8.0 may define one or more scheduling availability restrictions when a UE 120 is performing CLI measurements.

The one or more scheduling availability restrictions may define valid communications and invalid communications. A "valid" communication may be a scheduled or configured communication that is available (for example, that the UE 120 is expected to receive or transmit). An "invalid" communication or a "restricted" communication may be a communication that is unavailable (for example, that the UE 120 is not expected to receive or transmit), such as indicated by the one or more scheduling availability restrictions. A UE 120 may drop (for example, refrain from transmitting or receiving) an invalid communication or a restricted communication. For example, if the one or more scheduling availability restrictions indicate that the UE 120 is not expected to transmit or receive a given communication, then the UE 120 may drop (for example, refrain from transmitting or receiving) the given communication.

For example, the one or more scheduling availability restrictions may indicate communications that at least partially overlap with time domain resources (for example, OFDM symbols) associated with CLI measurements are invalid communications. Additionally, the one or more scheduling availability restrictions may indicate communications that at least partially overlap with a time gap (for example, a quantity of OFDM symbols) occurring before and/or after CLI measurements are invalid communications. When TDD intra-band carrier aggregation is configured, the scheduling restrictions on a serving cell where CLI measurements are performed may apply on all serving cells in the same band on the symbols that fully or partially overlap with restricted symbols.

For example, the one or more scheduling availability restrictions for CLI measurements may indicate that a UE 120 is not expected to transmit PUCCH communications, PUSCH communications, and/or sounding reference signal (SRS) communications on OFDM symbols on which the UE 120 performs CLI measurements, and on one (1) data symbol before an OFDM symbol used for CLI measurements (for example, for a 15 kHz and/or a 30 kHz subcarrier spacing in FR1 or for a 60 kHz subcarrier spacing in FR2) or on two (2) data symbols before an OFDM symbol used for CLI measurements (for example, for a 60 kHz subcarrier spacing in FR1 or a 120 kHz spacing in FR2). As another example, for a UE 120 that does not support serving cell downlink signal/channel and SRS-RSRP frequency division multiplexed reception (for example, does not support cli-SRS-RSRP-FDM_DL), the UE 120 may not be expected to receive physical downlink control channel (PDCCH) communications, physical downlink shared channel (PDSCH) communications, and/or channel state information (CSI) reference signals (CSI-RS) for tracking and/or for CQI on OFDM symbols on which the UE 120 performs SRS-RSRP measurements, and on one (1) data symbol before an OFDM symbol used for SRS-RSRP measurements (for example, for a 15 kHz and/or a 30 kHz subcarrier spacing in FR1 or for a 60 kHz subcarrier spacing in FR2) or on two (2) data symbols before an OFDM symbol used for SRS-RSRP measurements (for example, for a 60 kHz subcarrier spacing in FR1 or a 120 kHz spacing in FR2).

As another example, for a UE 120 that does not support serving cell downlink signal/channel (for example, PDSCH/PDCCH) and CLI-RSSI frequency division multiplexed reception (for example, does not support cli-RSSI-FDM-DL), the UE 120 may not be expected to receive PDCCH communications, PDSCH communications, and/or CSI-RS for tracking and/or for CQI on OFDM symbols on which the UE 120 performs CLI-RSSI measurements, and on one (1) data symbol before an OFDM symbol used for CLI-RSSI measurements (for example, for a 15 kHz and/or a 30 kHz subcarrier spacing in FR1 or for a 60 kHz subcarrier spacing in FR2) or on two (2) data symbol before an OFDM symbol used for CLI-RSSI measurements (for example, for a 60 kHz subcarrier spacing in FR1 or a 120 kHz spacing in FR2).

Figure 4:
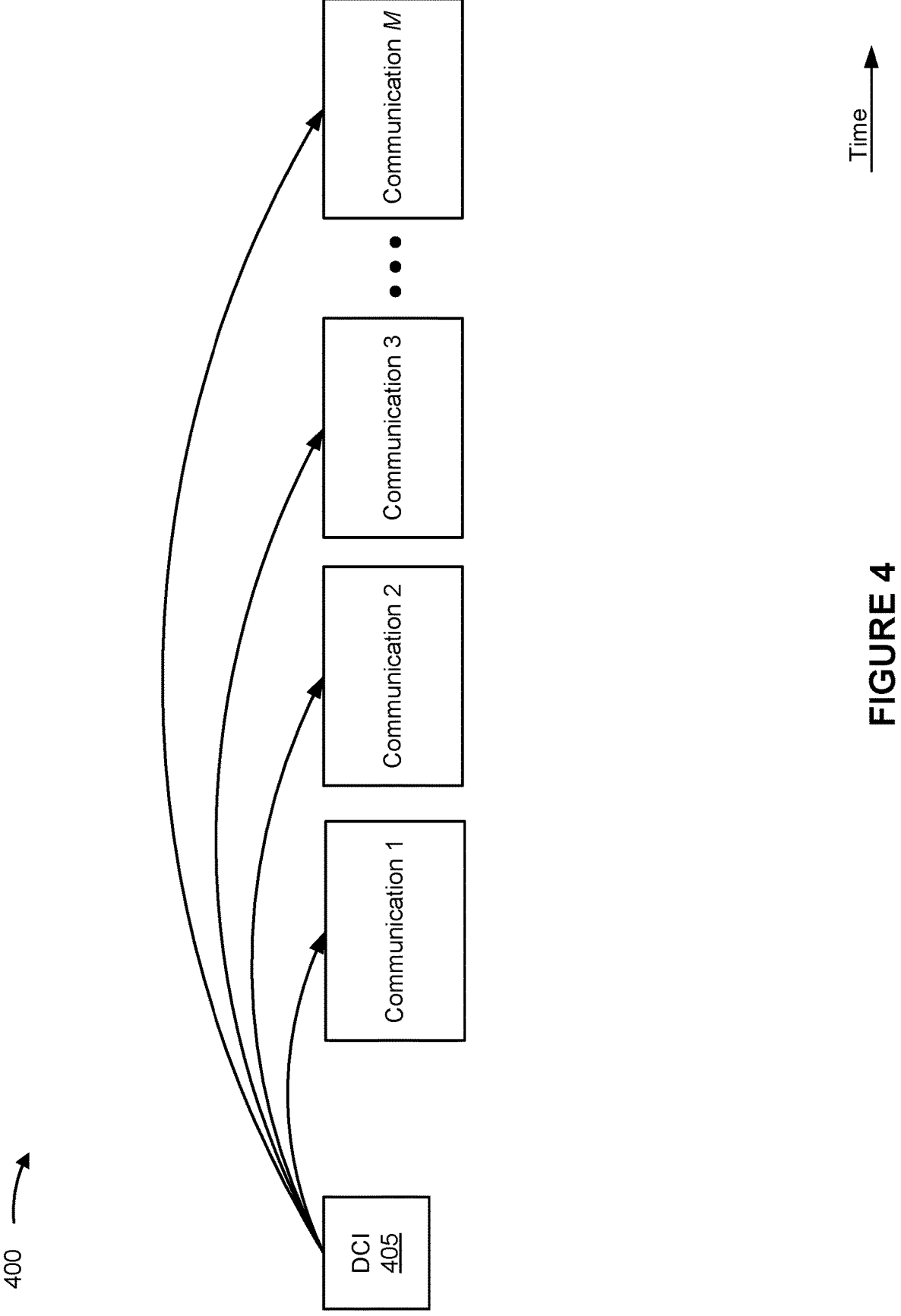
FIG. 4 is a diagram illustrating an example associated with multi-communication scheduling in accordance with the present disclosure.

FIG. 4 is a diagram illustrating an example associated with multi-communication scheduling 400 in accordance with the present disclosure. For example, as shown in FIG. 4, DCI 405 may schedule multiple communications, shown as communication 1 through communication M. The communications may be uplink communications (for example, PUSCH communications) or downlink communications (for example, PDSCH communications).

For example, when scheduling a communication, a network node 110 may transmit, and a UE 120 may receive, DCI 405. The DCI 405 may indicate a time domain resource assignment (TDRA) for one or more communications. For example, the DCI 405 may include a TDRA field that includes a TDRA index value. The TDRA index value may indicate a row index of a corresponding TDRA table, and the row index may correspond to a set of TDRA parameters (sometimes referred to as scheduling parameters or scheduling information). In some examples, the set of TDRA parameters may include one or more start and length indicator values (SLIVs) and scheduling offset values. The network node 110 and the UE 120 may use those TDRA parameters for the scheduled communications. For example, a TDRA index value of z in the DCI 405 may correspond to a row index of z+1 in the TDRA table. For example, a TDRA index value of 0 may correspond to a row index of 1.

For a downlink communication (for example, a PDSCH communication), the TDRA parameters may include, for example, a K0 value, an S value, and an L value. The K0 value may represent a scheduling offset (for example, in number of slots) between the slot containing the DCI 405 (that schedules the downlink communication) and the slot containing the scheduled downlink communication (scheduled by the scheduling DCI). The S value may represent a starting symbol for the downlink communication in the indicated slot. The L value may represent a length (for example, a number of consecutive symbols) of the downlink communication (for example, in the indicated slot). For an uplink communication (for example, a PUSCH communication), the TDRA parameters may include, for example, a K2 value, an S value, and an/value. The K2 value may represent a scheduling offset (for example, in number of slots) between the slot containing the DCI 405 (that schedules the uplink communication) and the slot containing the scheduled uplink communication (scheduled by the DCI 405). The S value may represent a starting symbol for the uplink communication in the indicated slot. The L value may represent a length (for example, a number of consecutive symbols) of the uplink communication (for example, in the indicated slot).

A quantity of communications (for example, M) scheduled by the DCI 405 may be the quantity of SLIVs contained in an indicated row of a TDRA table (for example, a row indicated by the TDRA field in the DCI 405). In some examples, the multiple communications may be included in consecutive slots. In other examples, the multiple communications may be included in non-consecutive slots. Each communication may have a different SLIV. In some examples, some parameters may be shared among the multiple communications, such as an MCS, and/or a frequency domain resource assignment, among other examples. In some examples, some parameters may be indicated for respective communications, such as a new data indicator (NDI), and/or a redundancy version (RV), among other examples.

In some examples, the DCI 405 may indicate a HARQ identifier. The HARQ identifier may also be referred to as a HARQ process identifier. HARQ refers to a retransmission protocol in which a receiver checks for errors in received data and, if an error is detected, then the receiver buffers the received data and requests a retransmission from a transmitter. A HARQ receiver is then able to combine the buffered received data with retransmitted data prior to channel decoding and error detection, which improves performance of the retransmission. The HARQ protocol can be implemented at a MAC layer. The HARQ protocol relies on the transmitter receiving acknowledgements (for example, acknowledgments (ACKs) or negative acknowledgments (NACKs)) from the receiver. The round trip time, which includes both a processing time of the transmitter and a processing time of the receiver as well as propagation delays, means that such acknowledgements are not received instantaneously.

In general, the transmitter becomes inactive (with respect to communicating with the receiver wireless communication device) while waiting for an acknowledgment or waiting for a scheduling opportunity, meaning that average throughput may be relatively low. This corresponds to a single HARQ process (also referred to as a stop and wait (SAW) process). A HARQ process stops and waits for an acknowledgment before proceeding to transfer additional data. Multiple HARQ processes can be used to avoid the round trip time having an impact on throughput. That is, other HARQ processes may transfer data while a given HARQ process is waiting for an acknowledgment. A HARQ entity within the MAC layer manages the multiple HARQ processes. In operation, the transmitter buffers transmitted data until a positive acknowledgment has been received (in case a retransmission is needed). Data is cleared from the transmit buffer once a positive acknowledgment has been received or the maximum number of allowed retransmissions has been reached. New data can be sent by a given HARQ process once a transmit buffer of the transmitter has been cleared.

The HARQ protocol can be used on the downlink or on the uplink. "Downlink HARQ" may refer to the transfer of downlink data on a PDSCH with HARQ acknowledgments returned either on a PUCCH or a PUSCH. "Uplink HARQ" may refer to the transfer of uplink data on a PUSCH with HARQ acknowledgments returned on a PDCCH. For both downlink HARQ and uplink HARQ, each serving cell has its own HARQ entity and its own set of HARQ processes. Further, both downlink HARQ and uplink HARQ are asynchronous, meaning that there is no fixed timing pattern for each HARQ process. Rather, a network node must signal an identity of a relevant HARQ process with each downlink resource allocation. While asynchronous HARQ increases signaling overhead, asynchronous HARQ increases flexibility since retransmissions do not have to be scheduled during specific slots.

For example, the DCI 405 may indicate a single HARQ identifier. A receiver (for example, a UE 120) may apply or assign the HARQ identifier to a first scheduled communication in time (for example, the communication 1 as shown in FIG. 4). For example, the UE 120 may increment the indicated HARQ identifier to determine HARQ identifiers for other communications scheduled by the DCI 405. This reduces a size of the DCI 405 and reduces signaling overhead associated with scheduling multiple communications using a single DCI. For example, the DCI 405 may indicate a HARQ identifier 0. The UE 120 may assign or apply the HARQ identifier 0 to the communication 1. For a next communication in time (for example, the communication 2), the UE 120 may increment the HARQ identifier 0 (for example, add a value of 1 to the previous HARQ identifier). For example, the UE 120 may assign or apply the HARQ identifier 1 to the communication 1 (for example, 0+1=1). Similarly, the UE 120 may increment the HARQ identifier and assign or apply the HARQ identifier 2 to the communication 2 (for example, 1+1=2). The UE 120 may continue to increment the HARQ identifier and apply identifiers for respective communications scheduled by the DCI 405 (for example, the communication 3 may be associated with a HARQ identifier 3 and the communication M may be associated with a HARQ identifier M).

Synchronization of HARQ identifiers between a transmitter and a receiver is important for ensuring that a HARQ process can be performed accurately. For example, a UE 120 or a network node 110 may use the HARQ identifier to track or identify data in a buffer to enable the UE 120 or the network node 110 to retransmit the data and/or to combine the buffered data with retransmitted data. If the HARQ identifier is incorrectly assigned or tracked, then the UE 120 or the network node 110 may retransmit incorrect data and/or may attempt to combine buffered data with unrelated retransmitted data. This may cause errors in decoding and/or receiving the data. Additionally, incorrectly assigning or tracking the HARQ identifier may cause subsequent HARQ identifiers that are based on, or otherwise associated with, (for example, incremented from) the HARQ identifier to also be incorrect.

For example, a network node 110 may transmit, and a UE 120 may receive, a TDD configuration (for example, a common TDD configuration or a dedicated TDD configuration for the UE 120) that indicates communication directions associated with respective time intervals (for example, slots or symbols). For example, the TDD configuration may indicate a pattern of downlink slots, uplink slots, mixture slots, and/or flexible slots. A downlink slot may refer to a time interval during which only downlink communications are permitted. An uplink slot may refer to a time interval during which only uplink communications are permitted. A mixture slot may refer to a time interval during which only uplink communications are permitted in a first subset of OFDM symbols of the slot and only downlink communications are permitted in a second subset of OFDM symbols of the slot. A flexible slot may refer to a time interval during which uplink communications and downlink communications are permitted. The TDD configuration may be a semi-static configuration. In some examples, such as when the DCI schedules multiple communications, one or more of the scheduled communications may occur in a slot or time interval associated with conflicting communication directions. A conflicting communication direction may refer to a communication direction that is different than the communication direction associated with the scheduled communication. For example, an uplink communication may be scheduled in a downlink slot or a downlink communication may be scheduled in an uplink slot. In such examples, the UE 120 may drop the scheduled communication and may skip the incrementation of the HARQ identifier. As another example, if a communication is scheduled to occur during a flexible slot or symbol and time domain resources of the communication at least partially overlap with time domain resources of a synchronization signal block (SSB) or indicated by a PDCCH configuration for a system information block (SIB) 1 (for example, in a master information block (MIB)) for a control resource set (CORESET) associated with a Type-0 PDCCH common search space (CSS) set, then the UE 120 may drop the scheduled communication and may skip the incrementation of the HARQ identifier.

For example, if the communication 2 (as shown in FIG. 4) is an uplink communication and is scheduled to occur during a downlink time interval (for example, a downlink slot or symbol), then the UE 120 may drop (for example, not transmit) the communication 2 and may not increment the HARQ identifier for the communication 2. Therefore, rather than the communication 3 being associated with the HARQ identifier 3, as described above, the communication 3 may be associated with the HARQ identifier 2. Similarly, the communication M may be associated with a HARQ identifier M–1 (for example, assuming only the communication 2 is dropped). Refraining from incrementing the HARQ identifier in such scenarios ensures that there is no misalignment between the UE 120 and the network node 110 for the HARQ identifiers, ensures that there is not an over-dimensioning of HARQ identifiers, and ensures that HARQ identifiers are continuously used by the UE 120 and the network node 110, thereby reducing a complexity and simplifying a management of the HARQ processes.

In some examples, the UE 120 may drop (for example, not transmit or receive) a communication that at least partially overlaps with a conflicting communication direction as indicated by another DCI or a slot format indication (SFI) DCI. Additionally or alternatively, the UE 120 may drop a communication based on, or otherwise associated with, an uplink cancellation indication, a high priority communication, or other dynamic signaling. However, the UE 120 may still increment the HARQ identifier for these dropped communications because of the potential of missed detections associated with dynamic signaling (for example, dynamic signaling may be less robust against missed detections).

However, in some examples, a communication (for example, from multiple communications that are scheduled by a single DCI or other scheduling information) may be dropped for other reasons (for example, other than being associated with a slot that is associated with a conflicting communication direction) that are not associated with high risks of missed detections (for example, unlink the dynamic signaling described above). For example, as described in more detail elsewhere herein, a UE 120 may drop (for example, not transmit or receive) a communication based on, or otherwise associated with, a configured CLI measurement resource. However, if the dropped communication is a communication that is scheduled with multiple communications (for example, such as a communication scheduled by the DCI 405), the UE 120 and the network node 110 may not be synchronized in a handling of HARQ identifiers associated with the multiple communications. For example, handling of incrementing or determining HARQ identifiers for the multiple communications is not defined. Therefore, the UE 120 and the network node 110 may perform different operations (for example, incrementing or not incrementing) for the HARQ identifier associated with a communication that is dropped due to at least partially overlapping in the time domain with resources associated with a CLI measurement. This may cause errors associated with the HARQ processes for the dropped communication and for other communications included in the multiple communications. Additionally, this may cause the UE 120 and the network node 110 to needlessly use or consume HARQ identifiers for the dropped communication.

Various aspects relate generally to HARQ identifier determination associated with CLI measurements. Some aspects more specifically relate to handling of HARQ identifier determinations for communications that are dropped (for example, not transmitted or received) due to an overlap, in the time domain, with a CLI measurement. For example, the dropped communication may be a communication that is scheduled with multiple communications, such as via a single DCI communication or as part of another semi-static configuration, such as an SPS configuration or a CG configuration. In some aspects, a UE 120 and/or a network node 110 may drop (for example, may not be expected to receive or transmit) a communication because time domain resources of the communication at least partially overlap with time domain resources associated with a CLI measurement (for example, with CLI measurement resources and/or a time gap associated with the CLI measurement). In some aspects, the UE 120 and/or the network node 110 may refrain from incrementing a HARQ identifier for communications that are dropped due to collisions (for example, in the time domain) with CLI measurements. In other words, for scheduling information associated with scheduling multiple communications where the scheduling information indicates or is associated with a single HARQ identifier, the UE 120 and/or the network node 110 may not increment the HARQ identifier for communications, from the multiple communications, that are dropped because of a collision (for example, in the time domain) with a CLI measurement.

In some aspects, the multiple communications may be uplink communications (for example, PUSCH communications) or downlink communications (for example, PDSCH communications) scheduled by a single DCI communication. The single DCI communication may indicate a single HARQ identifier. The UE 120 and/or the network node 110 may not increment the single HARQ identifier for communications, from the multiple communications, that are dropped because of a collision (for example, in the time domain) with a CLI measurement. Additionally, the UE 120 and/or the network node 110 may not apply the HARQ identifier indicated by the DCI to the dropped communication.

In some aspects, the multiple communications may be semi-statically configured (for example, rather than scheduled by DCI). For example, the multiple communications may be SPS communications or CG configurations. In such examples, the HARQ identifier associated with a period (for example, an SPS period or a CG period) may not be incremented for communications, from the multiple semi-static communications, that are dropped because of a collision with a CLI measurement, because they occur during a slot associated with a conflicting communication direction, and/or for another reason. Additionally, the UE 120 and/or the network node 110 may not apply the initial HARQ identifier determined for the period to the dropped communication.

Particular aspects of the subject matter described in this disclosure can be implemented to realize one or more of the following potential advantages. In some examples, the described techniques can be used to synchronize a handling of HARQ identifier determinations between a UE 120 and a network node 110 when communications are dropped (for example, not transmitted or received) because of a collision with a CLI measurement. This ensures that there is no misalignment between the UE 120 and the network node 110 for the HARQ identifiers, ensures that there is not an over-dimensioning of HARQ identifiers, and ensures that HARQ identifiers are continuously used by the UE 120 and the network node 110, thereby reducing a complexity and simplifying a management of the HARQ processes, among other examples.

FIG. 5 is a diagram of an example associated with HARQ identifier determinations 500 associated with CLI measurements in accordance with the present disclosure. As shown in FIG. 5, one or more network nodes 110 (for example, a network node 110, a base station, a gNB, a CU, a DU, and/or an RU) may communicate with a UE 120. In some aspects, the network node(s) 110, and the UE 120 may be part of a wireless network, such as the wireless network 100. The UE 120 and a network node 110 may have established a wireless connection prior to operations shown in FIG. 5.

In some aspects, operations described herein as being performed by a network node 110 may be performed by multiple different network nodes. For example, configuration operations may be performed by a first network node (for example, a CU or a DU), and radio communication operations may be performed by a second network node (for example, a DU or an RU).

As used herein, the network node 110 "outputting" or "transmitting" a communication to the UE 120 may refer to a direct transmission (for example, from the network node 110 to the UE 120) or an indirect transmission via one or more other network nodes or devices. For example, if the network node 110 is a DU, an indirect transmission to the UE 120 may include the DU outputting or transmitting a communication to an RU and the RU transmitting the communication to the UE 120, or may include causing the RU to transmit the communication (for example, triggering transmission of a physical layer reference signal). Similarly, the UE 120 "transmitting" a communication to the network node 110 may refer to a direct transmission (for example, from the UE 120 to the network node 110) or an indirect transmission via one or more other network nodes or devices. For example, if the network node 110 is a DU, an indirect transmission to the network node 110 may include the UE 120 transmitting a communication to an RU and the RU transmitting the communication to the DU. Similarly, the network node 110 "obtaining" or "receiving" a communication may refer to receiving a transmission carrying the communication directly (for example, from the UE 120 to the network node 110) or receiving the communication (or information derived from reception of the communication) via one or more other network nodes or devices.

In a first operation 505, the UE 120 may transmit, and the network node 110 may receive or obtain, a capability report. The capability report may indicate UE support for HARQ identifier handling for communications that are dropped due to collisions with CLI measurements, as described in more detail elsewhere herein. For example, the capability report may indicate that the UE 120 supports skipping and/or not incrementing a HARQ identifier value for communications (for example, of multiple communications that are scheduled together, such as via a single DCI communication) that are dropped (for example, not transmitted or received) due to a collision with resources associated with a CLI measurement.

In some aspects, the capability report may indicate one or more UE capabilities associated with CLI measurements. For example, the capability report may indicate whether the UE 120 supports serving cell downlink signal/channel and SRS-RSRP frequency division multiplexed reception (for example, a cli-SRS-RSRP-FDM_DL capability, as defined, or otherwise fixed, by the 3GPP). As another example, the capability report may indicate whether the UE 120 supports serving cell downlink signal/channel (for example, PDSCH/PDCCH) and CLI-RSSI frequency division multiplexed reception (for example, a cli-RSSI-FDM-DL capability, as defined, or otherwise fixed, by the 3GPP). The capability report may be included in an uplink communication, a PUCCH communication, a PUSCH communication, an uplink control information (UCI) communication, and/or a UE assistance information (UAI) communication, among other examples.

In a second operation 510, the network node 110 may transmit or output, and the UE 120 may receive, configuration information. In some aspects, the UE 120 may receive the configuration information via one or more of system information signaling, RRC signaling, one or more MAC-CEs, and/or DCI, among other examples. In some aspects, the configuration information may include an indication of one or more configuration parameters (for example, already stored by the UE 120 and/or previously indicated by the network node 110 or other network device) for selection by the UE 120, and/or explicit configuration information for the UE 120 to use to configure itself, among other examples.

In some aspects, the configuration information may indicate that the UE 120 is to refrain from incrementing HARQ identifier values for communications (for example, of multiple communications that are scheduled together, such as via a single DCI communication) that are dropped (for example, not transmitted or received) due to a collision with a CLI measurement. For example, the configuration information may indicate that for multiple communications that are scheduled via a single DCI communication, if a communication (for example, of the multiple communications) at least partially overlaps in the time domain with resources associated with a CLI measurement, then HARQ identifier incrementing is to be skipped for the communication. Further, the configuration information may indicate that a HARQ identifier indicated by the DCI is not to be applied to the communication.

For example, as described in more detail elsewhere herein, a communication (for example, a PUSCH communication or a PDSCH) communication is to be dropped (for example, the UE 120 is not expected to transmit or receive the communication) if time domain resources of the communication as least partially overlap with time domain resources associated with a CLI measurement. The time domain resources associated with the CLI measurement may include resources (for example, OFDM symbol(s)) during which the UE 120 is to perform the CLI measurement and a time gap before and/or after the resources (for example, OFDM symbol(s)) during which the UE 120 is to perform the CLI measurement. The time gap may be different for different subcarrier spacings and for different operating frequency ranges (for example, FR1 or FR2). For example, if the UE 120 does not support frequency division multiplexing of a transmission or reception of a communication with a CLI measurement resource (for example, indicated by different capabilities of the UE 120 for different measurement types, such as a CLI RSSI based CLI measurement or an SRS RSRP based CLI measurement), then the UE 120 does not support receiving or transmitting a communication in time domain resources that at least partially overlaps with the resources associated with the CLI measurement, as described in more detail elsewhere herein. In such scenarios, the UE 120 may drop the communication and may refrain from performing HARQ identifier incrementing for the communication.

In some aspects, the configuration information may indicate that for semi-static communications (for example, SPS communications or CG communications) where multiple communication occasions are configured together in a single period under the same configuration, the UE 120 is to refrain from incrementing HARQ identifier values for invalid communications. As used herein, an "occasion" may refer to configured radio resources (for example, time/frequency resources) that are available for a UE 120 to use to receive or transmit a communication. An invalid communication may be a communication that is dropped due to an overlap, in the time domain, with a slot or symbol having a conflicting communication direction, with an SSB or a given search space set (for example, a search space set configured via a pdcch-ConfigSIB1 configuration in a MIB for a CORESET for Type0-PDCCH CSS set) included in a flexible slot, and/or with a CLI measurement, as described in more detail elsewhere herein.

For example, the configuration information may indicate that for an SPS period with multiple PDSCH occasions, or a CG period with multiple PUSCH occasions, a PDSCH occasion of the multiple PDSCH occasions or a PUSCH occasion of the multiple PUSCH occasions is not considered as valid and HARQ ID incrementing is skipped if one or a combination of conditions is met. Otherwise, the PDSCH occasion or the PUSCH occasion is valid and HARQ ID incrementing is not skipped. For example, the conditions may include whether the occasion occurs in a slot or symbol associated with a conflicting communication direction (for example, whether the PDSCH/PUSCH occasion collides with UL/DL symbol(s) indicated by tdd-UL-DL-ConfigurationCommon or tdd-UL-DL-ConfigurationDedicated). As another example, the condition may include whether an uplink occasion (for example, a PUSCH occasion) occurs during a flexible symbol or slot that is associated with an SSB communication and/or associated with a search space that is associated with initial access or synchronization (for example, whether the PUSCH occasion collides with a flexible symbol or slot indicated by tdd-UL-DL-ConfigurationCommon or tdd-UL-DL-ConfigurationDedicated, and in this symbol or slot the PUSCH occasion collides with SSB symbol(s) indicated by ssb-PositionsInBurst or symbol(s) indicated by pdcch-ConfigSIB1 in MIB for a CORESET for Type0-PDCCH CSS set). As another example, the conditions may include whether a PDSCH occasion or a PUSCH occasion overlaps with a symbol colliding with a CLI measurement. In some aspects, the conditions may be defined, or otherwise fixed, by a wireless communication standard, such as the 3GPP (for example, in such cases, the conditions may not be indicated by the configuration information and may be pre-configured or configured for the UE 120 as part of an original equipment manufacturer (OEM) configuration).

In some aspects, the configuration information may include a CLI measurement configuration. For example, the UE 120 may be configured (for example, by the network node 110) to perform CLI measurements. For example, the network node 110 may transmit, and the UE 120 may receive, a configuration associated with cross-link interference, the configuration indicating one or more time domain resources associated with CLI measurements. For example, the CLI measurements may include CLI RSSI measurements and/or SRS RSRP measurements. For example, the CLI measurement configuration may indicate that the UE 120 is to perform and report CLI measurement information based on, or otherwise associated with, one or more SRS resources. As another example, the CLI measurement configuration may indicate that the UE 120 is to perform and report CLI measurement information based on, or otherwise associated with, CLI-RSSI resources. For example, the CLI measurement configuration may configure a measurement object associated with the CLI measurements. A measurement object may indicate a frequency/time location and subcarrier spacing of signals to be measured for a CLI measurement (for example, the frequency/time location of SRS resources and/or CLI-RSSI resources, and subcarrier spacing of SRS resources to be measured). For example, an RRC information element (for example, a MeasObjectCLI information element) may indicate information applicable for SRS-RSRP measurements and/or CLI-RSSI measurements for the CLI measurement configuration. For example, the CLI measurement configuration may indicate a configuration of SRS resources to be used for CLI measurements (for example, via an srs-ResourceConfig included in the CLI measurement configuration) and/or a configuration of CLI-RSSI resources for CLI measurement (for example, via an rssi-ResourceConfig included in the CLI measurement configuration). In some aspects, the configuration of the measurement object for a CLI measurement may indicate an SRS and/or CLI-RSSI resource configuration for the CLI measurement (for example, via a cli-ResourceConfig included in the configuration of the measurement object). The configuration of the resources (for example, SRS resources and/or CLI-RSSI resources) may indicate time/frequency resources, a periodicity, a slot offset, and/or other configuration information to enable the UE 120 to identify a location of the resources in time and/or frequency.

In some aspects, the configuration information may include a configuration of semi-static and/or periodic communications, such as an SPS configuration or a CG configuration. SPS communications may include periodic downlink communications that are configured for the UE 120, such that a network node 110 does not need to transmit (for example, directly or via one or more network nodes) separate DCI to schedule each downlink communication, thereby conserving signaling overhead. The UE 120 may be configured with an SPS configuration for SPS communications. For example, the UE 120 may receive the SPS configuration via RRC signaling transmitted by the network node 110 (for example, directly or via one or more network nodes). The SPS configuration may indicate a resource allocation associated with one or more SPS downlink occasions (for example, in a time domain, frequency domain, spatial domain, and/or code domain) and a periodicity at which the resource allocation for the occasions is repeated, resulting in periodically reoccurring scheduled SPS occasions for the UE 120. The SPS configuration may also configure HARQ-ACK feedback resources for the UE 120 to transmit HARQ-ACK feedback for SPS PDSCH communications received in a given SPS occasion.

CG communications may include periodic uplink communications that are configured for the UE 120, such that the network node 110 does not need to transmit separate DCI to schedule each uplink communication, thereby conserving signaling overhead. The UE 120 may be configured with a CG configuration for CG communications. For example, the UE 120 may receive the CG configuration via RRC signaling transmitted by the network node 110. The CG configuration may indicate a resource allocation associated with one or more CG uplink occasions (for example, in a time domain, frequency domain, spatial domain, and/or code domain) and a periodicity at which the resource allocation for the occasions repeated, resulting in periodically reoccurring scheduled CG occasions for the UE 120. In some examples, the CG configuration may identify a resource pool or multiple resource pools that are available to the UE 120 for an uplink transmission. The CG configuration may configure contention-free CG communications (for example, where resources are dedicated for the UE 120 to transmit uplink communications) or contention-based CG communications (for example, where the UE 120 contends for access to a channel in the configured resource allocation, such as by using a channel access procedure or a channel sensing procedure).

In some aspects, the configuration of the semi-static and/or periodic communications may include a period in which multiple occasions are configured. For example, the configuration information may indicate a period associated with the multiple semi-static communications. For example, the configuration information may indicate an SPS configuration (for example, a single SPS configuration) that configures multiple SPS occasions associated with an SPS period. Similarly, the configuration information may indicate a CG configuration (for example, a single CG configuration) that configures multiple CG occasions associated with a CG period. In such examples, the UE 120 may determine a HARQ identifier associated with the period (for example, the SPS period or the CG period) and may increment the HARQ identifier to assign HARQ identifiers for respective occasions included in the period. For example, the HARQ identifier associated with the period may be based on, or otherwise associated with, a HARQ identifier offset value, a symbol associated with the period, and a periodicity associated with the multiple semi-static communications. For example, the HARQ identifier associated with the period may be based on, or otherwise associated with, a floor(HARQ ID offset+a current symbol/SPS or CG periodicity) modulo the quantity of HARQ process allocated to the configuration of the period.

The UE 120 may configure itself based at least in part on the configuration information. In some aspects, the UE 120 may be configured to perform one or more operations described herein based at least in part on the configuration information.

In a third operation 515, the network node 110 may transmit, and the UE 120 may receive, scheduling information associated with scheduling multiple communications. For example, the network node 110 (for example, a DU) May determine the scheduling information. The UE 120 may receive the scheduling information from the network node 110 (for example, from an RU). The multiple communications may be multiple PDSCH communications or may be multiple PUSCH communications. In some aspects, the multiple communications may be dynamic grant communications. In such examples, the scheduling information may include DCI (for example, a single DCI communication scheduling the multiple communications). In other aspects, the multiple communications may be multiple semi-static or periodic communications, such as multiple SPS communications (or occasions) or multiple CG communications (or occasions). In such examples, the scheduling information may be included in the configuration information (for example, the third operation 515 may be performed as part of, or in a same signaling as, the second operation 510). The scheduling information and/or the multiple communications may be associated with a HARQ identifier (for example, a HARQ process identifier).

In a fourth operation 520, the UE 120 may identify or determine a HARQ identifier associated with the multiple communications. For example, the network node 110 may transmit, and the UE 120 may receive, DCI scheduling the multiple communications. The DCI may indicate a single HARQ identifier (for example, that is be assigned to or applied to a first valid communication in time of the multiple communications). For example, the UE 120 may perform HARQ identifier incrementing to determine HARQ identifiers for respective communications of the multiple communications (for example, by incrementing the value of the HARQ identifier indicated by the DCI for each communication of the multiple communications).

As another example, the UE 120 may determine an initial HARQ identifier associated with a period (for example, a CG period or an SPS period) associated with the multiple communications, such as when the multiple communications are semi-static or periodic communications (for example, SPS or CG communications). The initial HARQ identifier associated with the period may be assigned to or applied to a first valid occasion in time of multiple occasions associated with the period. For example, the initial HARQ identifier associated with the period may be based on, or otherwise associated with, a HARQ identifier offset value, a symbol associated with the period, and a periodicity associated with the multiple semi-static communications. For example, the initial HARQ identifier associated with the period may be based on, or otherwise associated with, a floor(HARQ ID offset+a current symbol/SPS or CG periodicity) modulo the quantity of HARQ process allocated to the configuration of the period. For example, the UE 120 may perform HARQ identifier incrementing to determine HARQ identifiers for respective occasions of the multiple occasions (for example, by incrementing the value of the initial HARQ identifier determined for the period for each occasion of the multiple occasions).

In a fifth operation 525, the UE 120 may detect that a communication (or occasion), from the multiple communications (or occasions), is to be dropped (for example, not transmitted or received by the UE 120). For example, based on, or otherwise associated with, one or more dropping rules, the UE 120 may not be expected to transmit or receive the communication or the occasion. For example, the one or more dropping rules may be based on, or otherwise associated with, the communication (or occasion) colliding with a CLI measurement (for example, in a similar manner as described in more detail in connection with FIG. 3). For example, the UE 120 may detect that time domain resources associated with the communication or occasion at least partially overlap in the time domain with resources associated with a CLI measurement (for example, with OFDM symbol(s) to be used to perform the measurement and/or with a time gap before or after the OFDM symbol(s)).

For example, the UE 120 may detect that a communication, of the multiple communications, that is scheduled via a single DCI communication, collides with resources associated with a CLI measurement. For example, a PUSCH communication or a PDSCH communication, scheduled by DCI that schedules multiple PUSCH communications or multiple PDSCH communications, may collide (for example, in the time domain) with a CLI measurement to be performed by the UE 120. Therefore, the UE 120 may detect that the PUSCH communication or the PDSCH communication is to be dropped (for example, not transmitted or received by the UE 120). In other words, the UE 120 may not be expected to transmit the PUSCH communication or to receive the PDSCH communication. The scenarios in which the UE 120 is to drop the communication due to a collision with a CLI measurement are described in more detail in connection with FIG. 3.

As another example, if the multiple communications are multiple semi-static or periodic occasions, then the UE 120 may detect that an occasion, from the multiple occasions associated with a given period, is invalid. For example, the UE 120 may detect that an occasion (for example, an SPS occasion or a CG occasion) is invalid based on, or otherwise associated with, resources associated with an occasion at least partially overlapping with a slot or symbol that is associated with a conflicting communication direction. For example, the UE 120 may receive a TDD configuration (for example, in the second operation 510). The conflicting communication direction may be indicated via the TDD configuration that indicates a pattern of communication directions for slots or symbols. The TDD configuration may be a cell specific or a UE specific TDD uplink/downlink configuration (for example, may be tdd-UL-DL-ConfigurationCommon or tdd-UL-DL-ConfigurationDedicated). As another example, the UE 120 may detect that an occasion (for example, an SPS occasion or a CG occasion) is invalid based on, or otherwise associated with, resources associated with an occasion at least partially overlapping with a flexible slot or symbol (for example, indicated by the TDD configuration) that is associated with an SSB communication (for example, an SSB indicated by ssb-PositionsInBurst). As another example, the UE 120 may detect that an occasion (for example, an SPS occasion or a CG occasion) is invalid based on, or otherwise associated with, resources associated with an occasion at least partially overlapping with a slot or symbol that is associated with a search space that is associated with initial access or synchronization (for example, the search space may be a search space #0 and/or associated with symbol(s) indicated by pdcch-ConfigSIB1 in a MIB for a CORESET for Type0-PDCCH CSS set). As another example, the UE 120 may detect that an occasion (for example, an SPS occasion or a CG occasion) is invalid based on, or otherwise associated with, resources associated with an occasion at least partially overlapping with resources associated with a CLI measurement, in a similar manner as described in more detail elsewhere herein.

In a sixth operation 530, the UE 120 may skip a HARQ process identifier value increment for the dropped communication(s). For example, the UE 120 may refrain from incrementing the HARQ identifier (for example, associated with the multiple communications as determined in the fourth operation 520) for the dropped communication(s) or occasion(s). For example, the UE 120 may refrain from incrementing the HARQ identifier for one or more communications or occasions that at least partially overlap in the time domain with the one or more time domain resources associated with the CLI measurements and/or based on, or otherwise associated with, other conditions as described in more detail elsewhere herein.

For example, for a single DCI scheduling the multiple communications, if a communication of the multiple communications overlaps with a symbol colliding with a CLI measurement, the HARQ process identifier value increment may be skipped for the communication. Further, the HARQ identifier indicated by the single DCI may not be applied or assigned to the communication. The UE 120 may skip an assignment of a HARQ identifier for the dropped communication(s). For example, the UE 120 may refrain from assigning or applying the HARQ identifier indicated by the single DCI to the communication that is dropped due to a collision with a CLI measurement.

For a semi-static communication period (for example, an SPS period or a CG period) associated with multiple occasions, if an occasion of the multiple occasions is invalid (for example, is determined to be not valid, in a similar manner as described in connection with the fifth operation 525), then the UE 120 may refrain from incrementing the HARQ identifier associated with the semi-static communication period for the occasion (for example, that is invalid and/or dropped). The initial HARQ identifier associated with the semi-static communication period may be applied or assigned to the first valid occasion (for example, first in time) among the multiple occasions associated with the semi-static communication period.

In some aspects, the UE 120 may determine that a communication or an occasion is to be skipped or not communicated. For example, the UE 120 may determine that no data is available to be communicated via a configured occasion, may determine that another communication is to be transmitted or received, and/or may otherwise determine that a scheduled communication and/or a configured occasion is not to be used by the UE 120. In such examples, the UE 120 may transmit, and the network node 110 may receive, an indication that the communication and/or the occasion is to be skipped or not used. For example, the UE 120 may transmit UCI indicating that a CG occasion, from multiple CG occasions associated with a CG period, is to be skipped or not used by the UE 120 for a PUSCH transmission. In such examples, the UE 120 and/or the network node 110 may consider the skipped communication or occasion as invalid. The UE 120 and/or the network node 110 may refrain from incrementing a HARQ identifier associated with the period for the skipped communication or occasion and may not assign or apply the initial HARQ identifier associated with the period to the skipped communication or occasion.

The network node 110 may perform similar, or the same, operations as the fourth operation 520, the fifth operation 525, and/or the sixth operation 530. For example, the network node 110 may track, determine, and/or maintain an indication of HARQ identifiers for communications in a similar manner as the UE 120 described herein.

In a seventh operation 535, the UE 120 and the network node 110 may communicate (for example, transmit or receive) one or more communications, the first one or more communications being associated with respective HARQ identifiers that are associated with incrementing the HARQ identifier only for the one or more communications (for example, and not for communication(s) or occasion(s) that are dropped, as described in more detail elsewhere herein). In other words, for valid communications or occasions from the multiple communications or occasions (for example, valid communications or occasions may not overlap in the time domain with resources associated with a CLI measurement and/or that satisfy one or more other criteria described herein), the UE 120 may determine HARQ identifiers for respective valid communications or occasions by incrementing a value of a HARQ identifier for each of the valid communications or occasions (for example, and not incrementing the value of the HARQ identifier for invalid communications or occasions).

This enables the UE 120 and the network node 110 to perform HARQ processes for the valid communications or occasions. For example, this ensures that HARQ identifiers are synchronized between the UE 120 and the network node 110 when a communication or occasion is dropped due to a collision with a CLI measurement or for other reasons described herein. Additionally, this reduces a consumption of a pool of HARQ process identifiers by not assigning HARQ identifiers to communications or occasions that are dropped due to a collision with a CLI measurement. For example, this may enable the UE 120 and the network node 110 to synchronize a handling of HARQ identifier determinations between a UE 120 and a network node 110 when communications are dropped (for example, not transmitted or received) because of a collision with a CLI measurement. This ensures that there is no misalignment between the UE 120 and the network node 110 for the HARQ identifiers, ensures that there is not an over-dimensioning of HARQ identifiers, and ensures that HARQ identifiers are continuously used by the UE 120 and the network node 110, thereby reducing a complexity and simplifying a management of the HARQ processes, among other examples.

Figure 6:
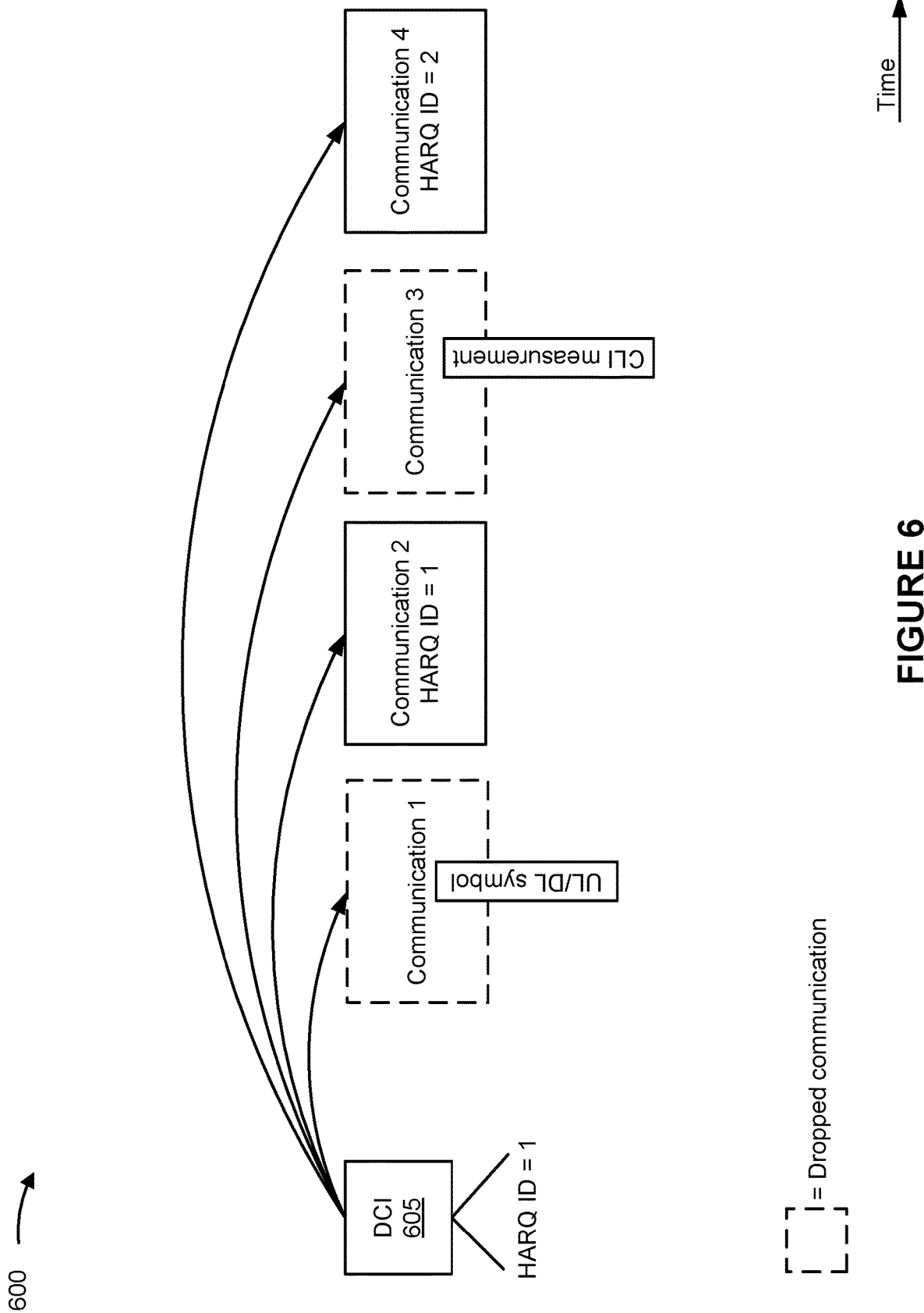
FIG. 6 is a diagram of an example associated with HARQ identifier determinations associated with CLI measurements in accordance with the present disclosure.

FIG. 6 is a diagram of an example associated with HARQ identifier determinations 600 associated with CLI measurements in accordance with the present disclosure. For example, FIG. 6 may depict an example associated with multiple communications (for example, communication 1, communication 2, communication 3, and communication 4 as shown in FIG. 6) that are scheduled by a DCI 605 (for example, a single DCI). For example, the communication 1, communication 2, communication 3, and communication 4 may be dynamic grant scheduled communications. In some aspects, communication 1, communication 2, communication 3, and communication 4 may be uplink communications (for example, PUSCH communications). In other aspects, communication 1, communication 2, communication 3, and communication 4 may be downlink communications (for example, PDSCH communications). Although four communications are shown as being scheduled by the DCI 605, in other examples the DCI 605 may schedule a different quantity of communications.

As shown in FIG. 6, a UE 120 may not be expected to transmit or receive one or more of the communications scheduled by the DCI 605. For example, the UE 120 may drop one or more of the communications scheduled by the DCI 605. As an example, and as shown in FIG. 6, the UE 120 may drop the communication 1 and the communication 3 and may communicate (for example, transmit or receive) the communication 2 and the communication 4. In other words, the communication 1 and the communication 3 may be invalid communications and the communication 2 and the communication 4 may be valid communications.

For example, time domain resources of the communication 1 may at least partially overlap with a symbol or slot that is associated with a conflicting communication direction (for example, as indicated by a TDD configuration). For example, if the communication 1 is a downlink communication, then the symbol or slot may be an uplink symbol or an uplink slot. Time domain resources of the communication 3 may at least partially overlap with a symbol that is associated with a CLI measurement, as described in more detail elsewhere herein. As a result, the UE 120 may not be expected to transmit or receive the communication 1 or the communication 3.

As shown in FIG. 6, the DCI 605 may indicate a HARQ process identifier (for example, shown as HARQ ID=1). For example, a value of the HARQ identifier indicated by the DCI 605 may be 1. The UE 120 may determine HARQ identifiers for respective communications scheduled by the DCI 605 by incrementing the value of the HARQ identifier indicated by the DCI 605. For example, the UE 120 may assign or apply the HARQ identifier indicated by the DCI 605 to a first valid communication, in time, scheduled by the DCI 605. For example, the communication 1 may be an invalid communication. Therefore, the UE 120 may refrain from incrementing the value of the HARQ identifier and may refrain from applying or assigning the HARQ identifier indicated by the DCI 605 to the communication 1. The UE 120 may assign or apply the HARQ identifier indicated by the DCI 605 to the communication 2 (for example, the first valid communication, in time, scheduled by the DCI 605). The UE 120 may refrain from incrementing the value of the HARQ identifier for the communication 3 and may refrain from applying or assigning the HARQ identifier indicated by the DCI 605 to the communication 3 because the communication 3 is dropped due to the collision with the CLI measurement. The UE 120 may increment the value of the HARQ identifier and may apply or assign the incremented value (for example, 2 because 1+1=2) for the communication 4 (for example, the next valid communication, in time, scheduled by the DCI 605).

Figure 7:
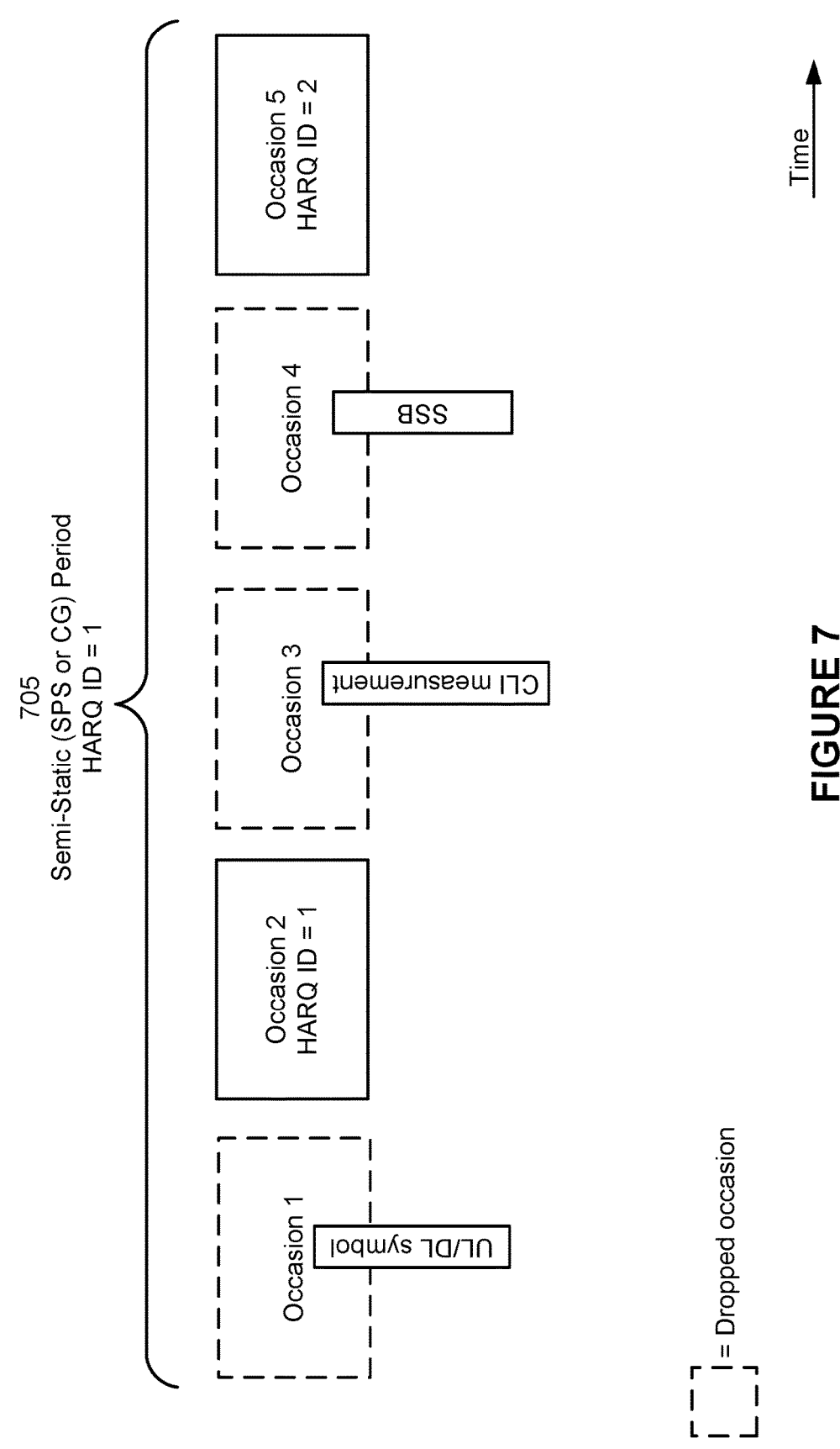
FIG. 7 is a diagram of an example associated with HARQ identifier determinations associated with CLI measurements in accordance with the present disclosure.

FIG. 7 is a diagram of an example associated with HARQ identifier determinations 700 associated with CLI measurements in accordance with the present disclosure. For example, FIG. 7 may depict an example associated with multiple occasions (for example, occasion 1, occasion 2, occasion 3, occasion 4, and occasion 5 as shown in FIG. 7). For example, the multiple occasions may be semi-static or periodic occasions (or may be occasions for semi-static or periodic communications). In some aspects, the multiple occasions may be uplink occasions (for example, CG occasions). In other aspects, the multiple occasions may be downlink occasions (for example, SPS communications). For example, the multiple occasions may be associated with a semi-static period 705. The semi-static period 705 may be associated with a single configuration (for example, a single SPS configuration or a single CG configuration). The semi-static period 705 may be an SPS period or a CG period. Although 5 occasions are shown as being associated with the semi-static period 705, in other examples the semi-static period 705 may include a different quantity of occasions.

The semi-static period 705 may be associated with an initial HARQ identifier. For example, a UE 120 and/or a network node 110 may determine the initial HARQ identifier for the semi-static period 705, in a similar manner as described in more detail elsewhere herein. As shown in FIG. 7, in some examples, the UE 120 may drop one or more of the occasions (for example, may not be expected to transmit or receive a communication using the one or more of the occasions). For example, the occasion 1 may collide with a symbol or a slot associated with a conflicting communication direction (for example, as indicated by a TDD configuration). For example, if the occasion 1 is an uplink occasion or a CG occasion, then the occasion 1 may be configured or scheduled to occur in radio resources that at least partially overlap, in the time domain, with a downlink slot or symbol. Therefore, the UE 120 may not be expected to transmit or receive using resources associated with the occasion 1.

The UE 120 may not be expected to transmit or receive communications using resources associated with the occasion 3 because the resources may collide with resources associated with a CLI measurement. For example, time domain resources associated with the occasion 3 may at least partially overlap, in the time domain, with resources associated with a CLI measurement. Therefore, in some examples and as described in more detail elsewhere herein, the UE 120 may not be expected to transmit or receive using resources associated with the occasion 3. The UE 120 may not be expected to transmit or receive communications using resources associated with the occasion 4 because the resources may collide with a symbol associated with an SSB reception. For example, the occasion 4 may be configured or scheduled to occur during a flexible slot or symbol (for example, as indicated by a TDD configuration) and the occasion 4 may be configured or scheduled to occur in time domain resources that at least partially overlap with a symbol associated with an SSB. Therefore, the UE 120 may not be expected to transmit or receive using resources associated with the occasion 4. The UE 120 may drop other occasions in a similar manner for other reasons described elsewhere herein.

In other words, the UE 120 may determine that the occasion 1, the occasion 3, and the occasion 4 are invalid occasion. The UE 120 may determine that the occasion 2 and the occasion 5 are valid occasions. Therefore, the UE 120 may use the occasion 2 and the occasion 5 for transmitting or receiving communications. As shown in FIG. 7, the UE 120 may assign or apply the initial HARQ identifier determined for the semi-static period 705 to the first, in time, valid occasion associated with the semi-static period 705. For example, the UE 120 may refrain from incrementing the initial HARQ identifier determined for the semi-static period 705 and/or may refrain from applying or assigning the initial HARQ identifier determined for the semi-static period 705 to the occasion 1. The UE 120 may assign or apply the initial HARQ identifier determined for the semi-static period 705 (for example, HARQ ID 1) to the occasion 2. The UE 120 may refrain from incrementing the initial HARQ identifier determined for the semi-static period 705 and/or may refrain from applying or assigning the HARQ identifier determined for the semi-static period 705 to the occasion 3 and the occasion 4. The UE 120 may increment the UE 120 may refrain from incrementing the HARQ identifier determined for the semi-static period 705 and may assign or apply the incremented HARQ identifier to the occasion 5 (for example, to the next, in time, valid occasion associated with the semi-static period 705). For example, as shown in FIG. 7, the UE 120 may assign or apply the HARQ identifier 2 for the occasion 5.

FIG. 8 is a flowchart illustrating an example process 800 performed, for example, by a UE that supports HARQ identifier determinations associated with CLI measurements in accordance with the present disclosure. Example process 800 is an example where the UE (for example, UE 120)

performs operations associated with HARQ identifier determinations associated with CLI measurements.

As shown in FIG. 8, in some aspects, process 800 may include receiving, from a network node, a configuration associated with cross-link interference, the configuration indicating one or more time domain resources associated with CLI measurements (block 810). For example, the UE (such as by using communication manager 1008 or reception component 1002, depicted in FIG. 10) may receive, from a network node, a configuration associated with cross-link interference, the configuration indicating one or more time domain resources associated with CLI measurements, as described above.

As further shown in FIG. 8, in some aspects, process 800 may include receiving, from the network node, scheduling information associated with scheduling multiple communications, the scheduling information identifying a HARQ identifier the scheduling information indicating that resources associated with a first one or more communications, of the multiple communications, do not overlap in a time domain with the one or more time domain resources and resources associated with a second one or more communications, of the multiple communications, at least partially overlap in the time domain with the one or more time domain resources associated with the CLI measurements (block 820). For example, the UE (such as by using communication manager 1008 or reception component 1002, depicted in FIG. 10) may receive, from the network node, scheduling information associated with scheduling multiple communications, the scheduling information identifying a HARQ identifier the scheduling information indicating that resources associated with a first one or more communications, of the multiple communications, do not overlap in a time domain with the one or more time domain resources and resources associated with a second one or more communications, of the multiple communications, at least partially overlap in the time domain with the one or more time domain resources associated with the CLI measurements, as described above.

As further shown in FIG. 8, in some aspects, process 800 may include communicating, with the network node, the first one or more communications, the first one or more communications being associated with respective HARQ identifiers that are identified by incrementing a value of the HARQ identifier only for the first one or more communications (block 830). For example, the UE (such as by using communication manager 1008, reception component 1002, or transmission component 1004, depicted in FIG. 10) may communicate, with the network node, the first one or more communications, the first one or more communications being associated with respective HARQ identifiers that are identified by incrementing a value of the HARQ identifier only for the first one or more communications, as described above.

Process 800 may include additional aspects, such as any single aspect or any combination of aspects described below or in connection with one or more other processes described elsewhere herein.

In a first additional aspect, process 800 includes skipping a HARQ identifier increment for the second one or more communications.

In a second additional aspect, alone or in combination with the first aspect, process 800 includes skipping an assignment of the HARQ identifier to the second one or more communications.

In a third additional aspect, alone or in combination with one or more of the first and second aspects, the scheduling information includes downlink control information scheduling the multiple communications.

In a fourth additional aspect, alone or in combination with one or more of the first through third aspects, the multiple communications include multiple PDSCH communications, or multiple PUSCH communications.

In a fifth additional aspect, alone or in combination with one or more of the first through fourth aspects, the multiple communications include multiple semi-static communications, and the scheduling information includes configuration information indicating a period associated with the multiple semi-static communications.

In a sixth additional aspect, alone or in combination with one or more of the first through fifth aspects, only incrementing the HARQ identifier for the first one or more communications is further associated with the resources associated with the first one or more communications not overlapping in the time domain with a slot or symbol that is associated with a conflicting communication direction, a flexible slot or symbol that is associated with an SSB communication, or a slot or symbol that is associated with a search space that is associated with initial access or synchronization.

In a seventh additional aspect, alone or in combination with one or more of the first through sixth aspects, process 800 includes receiving a TDD configuration indicating a pattern of communication directions for slots or symbols, the conflicting communication direction being indicated by the TDD configuration.

In an eighth additional aspect, alone or in combination with one or more of the first through seventh aspects, the HARQ identifier is associated with the period and is associated with a HARQ identifier offset value, a symbol associated with the period, and a periodicity associated with the multiple semi-static communications.

In a ninth additional aspect, alone or in combination with one or more of the first through eighth aspects, process 800 includes assigning the HARQ identifier to a communication, from the first one or more communications, that occurs first in the time domain, and incrementing the HARQ identifier only for the first one or more communications.

In a tenth additional aspect, alone or in combination with one or more of the first through ninth aspects, the multiple semi-static communications include multiple SPS communications or multiple CG communications.

In an eleventh additional aspect, alone or in combination with one or more of the first through tenth aspects, process 800 includes transmitting, to the network node, an indication that a communication, from the multiple communications or the first one or more communications, is not to be transmitted by the UE, and skipping an increment or assignment of the HARQ identifier for the communication.

In a twelfth additional aspect, alone or in combination with one or more of the first through eleventh aspects, the one or more time domain resources associated with the CLI measurements include at least one of a first one or more symbols associated with measuring CLI, or a second one or more symbols before or after the first one or more symbols.

Although FIG. 8 shows example blocks of process 800, in some aspects, process 800 may include additional blocks, fewer blocks, different blocks, or differently arranged blocks than those depicted in FIG. 8. Additionally or alternatively, two or more of the blocks of process 800 may be performed in parallel.

FIG. 9 is a flowchart illustrating an example process 900 performed, for example, by a network node that supports HARQ identifier determinations associated with CLI measurements in accordance with the present disclosure. Example process 900 is an example where the network node (for example, network node 110) performs operations associated with HARQ identifier determinations associated with CLI measurements.

As shown in FIG. 9, in some aspects, process 900 may include transmitting a configuration, for a UE, associated with cross-link interference, the configuration indicating one or more time domain resources associated with CLI measurements (block 910). For example, the network node (such as by using communication manager 1108 or transmission component 1104, depicted in FIG. 11) may transmit a configuration, for a UE, associated with cross-link interference, the configuration indicating one or more time domain resources associated with CLI measurements, as described above.

As further shown in FIG. 9, in some aspects, process 900 may include transmitting scheduling information, for the UE, associated with scheduling multiple communications, the scheduling information identifying a HARQ identifier the scheduling information indicating that resources associated with a first one or more communications, of the multiple communications, do not overlap in a time domain with the one or more time domain resources and resources associated with a second one or more communications, of the multiple communications, at least partially overlap in the time domain with the one or more time domain resources associated with the CLI measurements (block 920). For example, the network node (such as by using communication manager 1108 or transmission component 1104, depicted in FIG. 11) may transmit scheduling information, for the UE, associated with scheduling multiple communications, the scheduling information identifying a HARQ identifier the scheduling information indicating that resources associated with a first one or more communications, of the multiple communications, do not overlap in a time domain with the one or more time domain resources and resources associated with a second one or more communications, of the multiple communications, at least partially overlap in the time domain with the one or more time domain resources associated with the CLI measurements, as described above.

As further shown in FIG. 9, in some aspects, process 900 may include communicating the first one or more communications associated with the UE, the first one or more communications being associated with respective HARQ identifiers that are identified by incrementing a value of the HARQ identifier only for the first one or more communications (block 930). For example, the network node (such as by using communication manager 1108, reception component 1102, or transmission component 1104, depicted in FIG. 11) may communicate the first one or more communications associated with the UE, the first one or more communications being associated with respective HARQ identifiers that are identified by incrementing a value of the HARQ identifier only for the first one or more communications, as described above.

Process 900 may include additional aspects, such as any single aspect or any combination of aspects described below or in connection with one or more other processes described elsewhere herein.

In a first additional aspect, process 900 includes skipping a HARQ identifier increment for the second one or more communications.

In a second additional aspect, alone or in combination with the first aspect, process 900 includes skipping an assignment of the HARQ identifier to the second one or more communications.

In a third additional aspect, alone or in combination with one or more of the first and second aspects, the scheduling information includes downlink control information scheduling the multiple communications.

In a fourth additional aspect, alone or in combination with one or more of the first through third aspects, the multiple communications include multiple PDSCH communications, or multiple PUSCH communications.

In a fifth additional aspect, alone or in combination with one or more of the first through fourth aspects, the multiple communications include multiple semi-static communications, and the scheduling information includes configuration information indicating a period associated with the multiple semi-static communications.

In a sixth additional aspect, alone or in combination with one or more of the first through fifth aspects, only incrementing the HARQ identifier for the first one or more communications is further associated with the resources associated with the first one or more communications not overlapping in the time domain with a slot or symbol that is associated with a conflicting communication direction, a flexible slot or symbol that is associated with an SSB communication, or a slot or symbol that is associated with a search space that is associated with initial access or synchronization.

In a seventh additional aspect, alone or in combination with one or more of the first through sixth aspects, process 900 includes transmitting a TDD configuration indicating a pattern of communication directions for slots or symbols, the conflicting communication direction being indicated by the TDD configuration.

In an eighth additional aspect, alone or in combination with one or more of the first through seventh aspects, the HARQ identifier is associated with the period and is associated with a HARQ identifier offset value, a symbol associated with the period, and a periodicity associated with the multiple semi-static communications.

In a ninth additional aspect, alone or in combination with one or more of the first through eighth aspects, process 900 includes assigning the HARQ identifier to a communication, from the first one or more communications, that occurs first in the time domain, and incrementing the HARQ identifier only for the first one or more communications.

In a tenth additional aspect, alone or in combination with one or more of the first through ninth aspects, the multiple semi-static communications include multiple SPS communications or multiple CG communications.

In an eleventh additional aspect, alone or in combination with one or more of the first through tenth aspects, process 900 includes receiving an indication, associated with the UE, that a communication, from the multiple communications or the first one or more communications, is not to be transmitted by the UE, and skipping, associated with receiving the indication, an increment or assignment of the HARQ identifier for the communication.

In a twelfth additional aspect, alone or in combination with one or more of the first through eleventh aspects, the one or more time domain resources associated with the CLI measurements include at least one of a first one or more symbols associated with measuring CLI, or a second one or more symbols before or after the first one or more symbols.

Although FIG. 9 shows example blocks of process 900, in some aspects, process 900 may include additional blocks, fewer blocks, different blocks, or differently arranged blocks than those depicted in FIG. 9. Additionally or alternatively, two or more of the blocks of process 900 may be performed in parallel.

Figure 10:
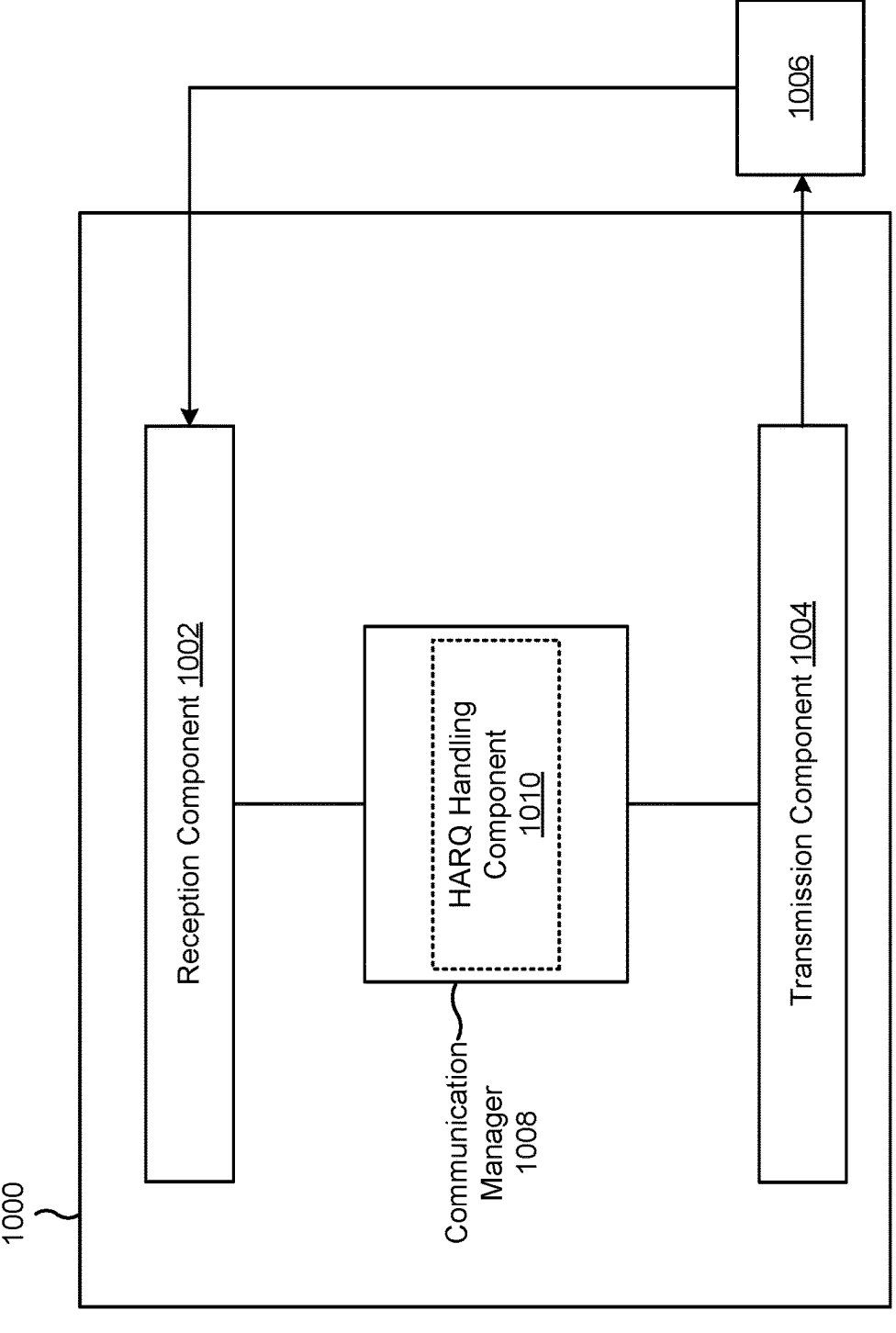
FIG. 10 is a diagram of an example apparatus for wireless communication that supports HARQ identifier determinations associated with CLI measurements in accordance with the present disclosure.

FIG. 10 is a diagram of an example apparatus 1000 for wireless communication that supports HARQ identifier determinations associated with CLI measurements in accordance with the present disclosure. The apparatus 1000 may be a UE, or a UE may include the apparatus 1000. In some aspects, the apparatus 1000 includes a reception component 1002, a transmission component 1004, and a communication manager 1008, which may be in communication with one another (for example, via one or more buses). In some aspects, the communication manager 1008 may be, or may be similar to, the communication manager 140. As shown, the apparatus 1000 may communicate with another apparatus 1006 (such as a UE, a network node, or another wireless communication device) using the reception component 1002 and the transmission component 1004.

In some aspects, the apparatus 1000 may be configured to and/or operable to perform one or more operations described herein in connection with FIGS. 5-7. Additionally or alternatively, the apparatus 1000 may be configured to and/or operable to perform one or more processes described herein, such as process 800 of FIG. 8. In some aspects, the apparatus 1000 may include one or more components of the UE described above in connection with FIG. 2.

The reception component 1002 may receive communications, such as reference signals, control information, and/or data communications, from the apparatus 1006. The reception component 1002 may provide received communications to one or more other components of the apparatus 1000, such as the communication manager 1008. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a modem, a demodulator, a MIMO detector, a receive processor, a controller/processor, and/or a memory of the UE described above in connection with FIG. 2.

The transmission component 1004 may transmit communications, such as reference signals, control information, and/or data communications, to the apparatus 1006. In some aspects, the communication manager 1008 may generate communications and may transmit the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, and/or a memory of the UE described above in connection with FIG. 2. In some aspects, the transmission component 1004 may be co-located with the reception component 1002 in a transceiver.

The communication manager 1008 may receive or may cause the reception component 1002 to receive, from a network node, a configuration associated with cross-link interference, the configuration indicating one or more time domain resources associated with CLI measurements. The communication manager 1008 may receive or may cause the reception component 1002 to receive, from the network node, scheduling information associated with scheduling multiple communications, the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements, and the scheduling information associated with a HARQ identifier. The communication manager 1008 may communicate, with the network node, the first one or more communications, the first one or more communications being associated with respective HARQ identifiers that are associated with incrementing the HARQ identifier only for the first one or more communications. In some aspects, the communication manager 1008 may perform one or more operations described elsewhere herein as being performed by one or more components of the communication manager 1008.

The communication manager 1008 may include a controller/processor, a memory, of the UE described above in connection with FIG. 2. In some aspects, the communication manager 1008 includes a set of components, such as a HARQ handling component 1010, among other examples. Alternatively, the set of components may be separate and distinct from the communication manager 1008. In some aspects, one or more components of the set of components may include or may be implemented within a controller/processor, a memory, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive, from a network node, a configuration associated with cross-link interference, the configuration indicating one or more time domain resources associated with CLI measurements. The reception component 1002 may receive, from the network node, scheduling information associated with scheduling multiple communications, the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements, and the scheduling information associated with a HARQ identifier. The reception component 1002 and/or the transmission component 1004 may communicate, with the network node, the first one or more communications, the first one or more communications being associated with respective HARQ identifiers that are associated with incrementing the HARQ identifier only for the first one or more communications.

The HARQ handling component 1010 may skip a HARQ identifier increment for the second one or more communications.

The HARQ handling component 1010 may skip an assignment of the HARQ identifier to the second one or more communications.

The reception component 1002 may receive a TDD configuration indicating a pattern of communication directions for slots or symbols, conflicting communication directions being indicated by the TDD configuration.

The HARQ handling component 1010 may assign the HARQ identifier to a communication, from the first one or more communications, that occurs first in the time domain.

The HARQ handling component 1010 may increment the HARQ identifier only for the first one or more communications.

The transmission component 1004 may transmit, to the network node, an indication that a communication, from the multiple communications or the first one or more communications, is not to be transmitted by the apparatus 1000.

The HARQ handling component 1010 may refrain from incrementing or assigning the HARQ identifier for the communication.

The quantity and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
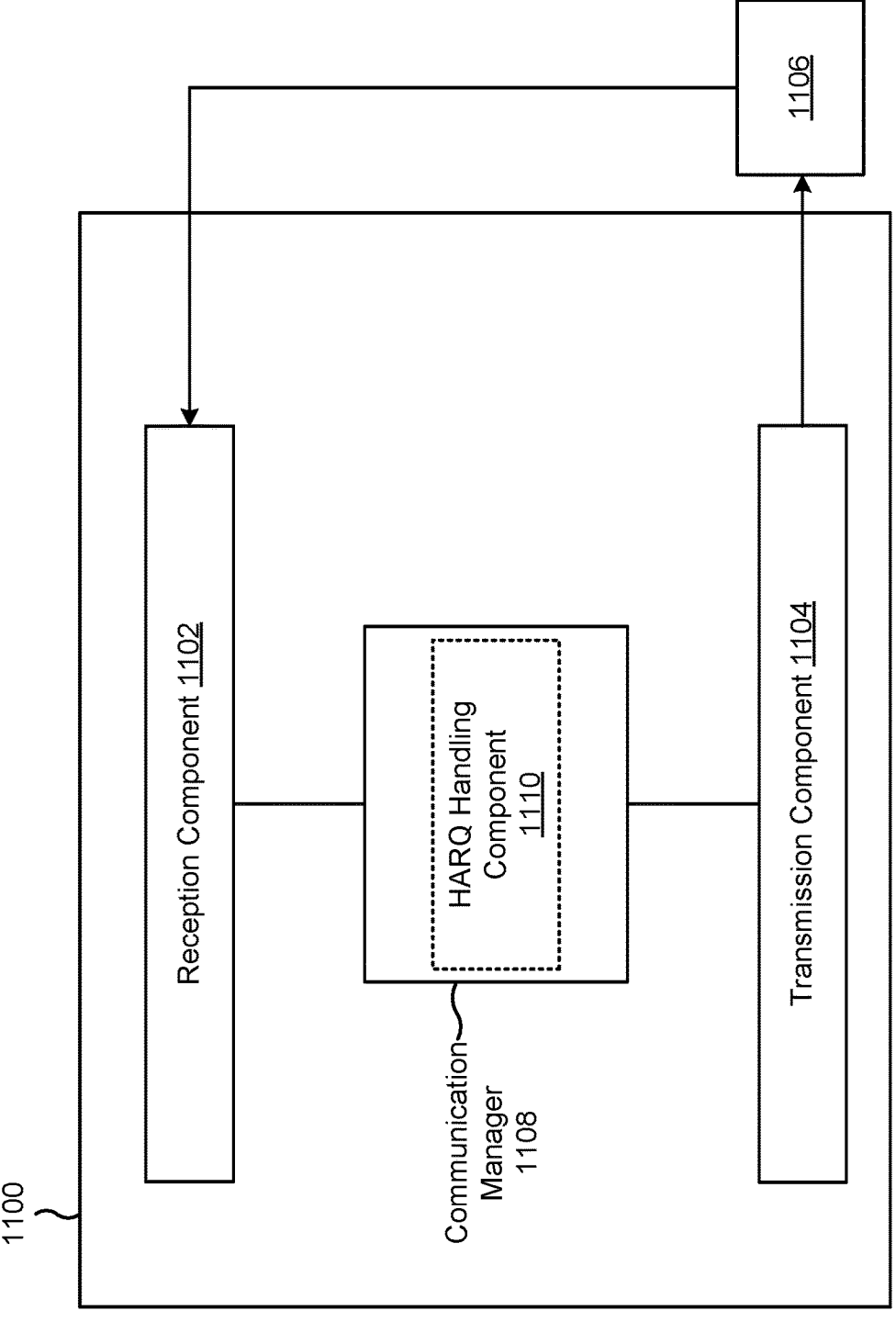
FIG. 11 is a diagram of an example apparatus for wireless communication that supports HARQ identifier determinations associated with CLI measurements in accordance with the present disclosure.

FIG. 11 is a diagram of an example apparatus 1100 for wireless communication that supports HARQ identifier determinations associated with CLI measurements in accordance with the present disclosure. The apparatus 1100 may be a network node, or a network node may include the apparatus 1100. In some aspects, the apparatus 1100 includes a reception component 1102, a transmission component 1104, and a communication manager 1108, which may be in communication with one another (for example, via one or more buses). The communication manager 1108 may be, or may be similar to, the communication manager 150. As shown, the apparatus 1100 may communicate with another apparatus 1106 (such as a UE, a network node, or another wireless communication device) using the reception component 1102 and the transmission component 1104.

In some aspects, the apparatus 1100 may be configured to and/or operable to perform one or more operations described herein in connection with FIGS. 5-7. Additionally or alternatively, the apparatus 1100 may be configured to and/or operable to perform one or more processes described herein, such as process 900 of FIG. 9. In some aspects, the apparatus 1100 may include one or more components of the network node described above in connection with FIG. 2.

The reception component 1102 may receive communications, such as reference signals, control information, and/or data communications, from the apparatus 1106. The reception component 1102 may provide received communications to one or more other components of the apparatus 1100, such as the communication manager 1108. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a modem, a demodulator, a MIMO detector, a receive processor, a controller/processor, and/or a memory of the network node described above in connection with FIG. 2.

The transmission component 1104 may transmit communications, such as reference signals, control information, and/or data communications, to the apparatus 1106. In some aspects, the communication manager 1108 may generate communications and may transmit the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, and/or a memory of the network node described above in connection with FIG. 2. In some aspects, the transmission component 1104 may be co-located with the reception component 1102 in a transceiver.

The communication manager 1108 may transmit or may cause the transmission component 1104 to transmit a configuration, for a UE, associated with cross-link interference, the configuration indicating one or more time domain resources associated with CLI measurements. The communication manager 1108 may transmit or may cause the transmission component 1104 to transmit scheduling information, for the UE, associated with scheduling multiple communications, the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements, and the scheduling information associated with a HARQ identifier. The communication manager 1108 may communicate the first one or more communications associated with the UE, the first one or more communications being associated with respective HARQ identifiers that are associated with incrementing the HARQ identifier only for the first one or more communications. In some aspects, the communication manager 1108 may perform one or more operations described elsewhere herein as being performed by one or more components of the communication manager 1108.

The communication manager 1108 may include a controller/processor, a memory, a scheduler, and/or a communication unit of the network node described above in connection with FIG. 2. In some aspects, the communication manager 1108 includes a set of components, such as a HARQ handling component 1110, among other examples. Alternatively, the set of components may be separate and distinct from the communication manager 1108. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 1104 may transmit a configuration, for a UE, associated with cross-link interference, the configuration indicating one or more time domain resources associated with CLI measurements. The transmission component 1104 may transmit scheduling information, for the UE, associated with scheduling multiple communications, the scheduling information indicating that resources associated with a first one or more communications, of the multiple communications, do not overlap in a time domain with the one or more time domain resources and that resources associated with a second one or more communications, of the multiple communications, at least partially overlap in the time domain with the one or more time domain resources associated with the CLI measurements, and the scheduling information associated with a HARQ identifier. The reception component 1102 and/or the transmission component 1104 may communicate the first one or more communications associated with the UE, the first one or more communications being associated with respective HARQ identifiers that are associated with incrementing the HARQ identifier only for the first one or more communications.

The HARQ handling component 1110 may refrain from incrementing the HARQ identifier for the second one or more communications.

The HARQ handling component 1110 may refrain from assigning the HARQ identifier to the second one or more communications.

The transmission component 1104 may transmit a TDD configuration indicating a pattern of communication directions for slots or symbols, the conflicting communication direction being indicated by the TDD configuration.

The HARQ handling component 1110 may assign the HARQ identifier to a communication, from the first one or more communications, that occurs first in the time domain.

The HARQ handling component 1110 may increment the HARQ identifier only for the first one or more communications.

The reception component 1102 may receive an indication, associated with the UE, that a communication, from the multiple communications or the first one or more communications, is not to be transmitted by the UE.

The HARQ handling component 1110 may refrain, associated with receiving the indication, from incrementing or assigning the HARQ identifier for the communication.

The quantity and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: receiving, from a network node, a configuration associated with cross-link interference, the configuration indicating one or more time domain resources associated with cross-link interference (CLI) measurements; receiving, from the network node, scheduling information associated with scheduling multiple communications, the scheduling information identifying a hybrid automatic repeat request (HARQ) identifier, and the scheduling information indicating that: resources associated with a first one or more communications, of the multiple communications, do not overlap in a time domain with the one or more time domain resources, and resources associated with a second one or more communications, of the multiple communications, at least partially overlap in the time domain with the one or more time domain resources associated with the CLI measurements; and communicating, with the network node, the first one or more communications, the first one or more communications being associated with respective HARQ identifiers that are identified by incrementing a value of the HARQ identifier only for the first one or more communications.

Aspect 2: The method of Aspect 1, further comprising: skipping a HARQ identifier increment for the second one or more communications.

Aspect 3: The method of any of Aspects 1-2, further comprising: skipping an assignment of the HARQ identifier to the second one or more communications.

Aspect 4: The method of any of Aspects 1-3, wherein the scheduling information includes downlink control information scheduling the multiple communications.

Aspect 5: The method of any of Aspects 1-4, wherein the multiple communications include: multiple physical downlink shared channel (PDSCH) communications, or multiple physical uplink shared channel (PUSCH) communications.

Aspect 6: The method of any of Aspects 1-5, wherein the multiple communications include multiple semi-static communications, and the scheduling information includes configuration information indicating a period associated with the multiple semi-static communications.

Aspect 7: The method of Aspect 6, wherein only incrementing the value of HARQ identifier for the first one or more communications is further associated with the resources associated with the first one or more communications not overlapping in the time domain with: a slot or symbol that is associated with a conflicting communication direction, a flexible slot or symbol that is associated with a synchronization signal block (SSB) communication, or a slot or symbol that is associated with a search space that is associated with initial access or synchronization.

Aspect 8: The method of Aspect 7, further comprising: receiving a time division duplexing (TDD) configuration indicating a pattern of communication directions for slots or symbols, the conflicting communication direction being indicated by the TDD configuration.

Aspect 9: The method of Aspect 6, wherein the HARQ identifier is associated with the period and is associated with a HARQ identifier offset value, a symbol associated with the period, and a periodicity associated with the multiple semi-static communications.

Aspect 10: The method of Aspect 9, further comprising: assigning the HARQ identifier to a communication, from the first one or more communications, that occurs first in the time domain; and incrementing the HARQ identifier only for the first one or more communications.

Aspect 11: The method of any of Aspects 6-10, wherein the multiple semi-static communications include multiple semi-persistent scheduling (SPS) communications or multiple configured grant (CG) communications.

Aspect 12: The method of any of Aspects 1-11, further comprising: transmitting, to the network node, an indication that a communication, from the multiple communications or the first one or more communications, is not to be transmitted by the UE; and skipping an increment or assignment of the HARQ identifier for the communication.

Aspect 13: The method of any of Aspects 1-12, wherein the one or more time domain resources associated with the CLI measurements include at least one of: a first one or more symbols associated with measuring CLI, or a second one or more symbols before or after the first one or more symbols.

Aspect 14: A method of wireless communication performed by a network node, comprising: transmitting a configuration, for a user equipment (UE), associated with cross-link interference, the configuration indicating one or more time domain resources associated with cross-link interference (CLI) measurements; transmitting scheduling information, for the UE, associated with scheduling multiple communications, the scheduling information identifying a hybrid automatic repeat request (HARQ) identifier, and the scheduling information indicating that: resources associated with a first one or more communications, of the multiple communications, do not overlap in a time domain with the one or more time domain resources, and resources associated with a second one or more communications, of the multiple communications, at least partially overlap in the time domain with the one or more time domain resources associated with the CLI measurements; and communicating the first one or more communications associated with the UE, the first one or more communications being associated with respective HARQ identifiers that are identified by incrementing a value of the HARQ identifier only for the first one or more communications.

Aspect 15: The method of Aspect 14, further comprising: skipping a HARQ identifier increment for the second one or more communications.

Aspect 16: The method of any of Aspects 14-15, further comprising: skipping an assignment of the HARQ identifier to the second one or more communications.

Aspect 17: The method of any of Aspects 14-16, wherein the scheduling information includes downlink control information scheduling the multiple communications.

Aspect 18: The method of any of Aspects 14-17, wherein the multiple communications include: multiple physical downlink shared channel (PDSCH) communications, or multiple physical uplink shared channel (PUSCH) communications.

Aspect 19: The method of any of Aspects 14-18, wherein the multiple communications include multiple semi-static communications, and the scheduling information includes configuration information indicating a period associated with the multiple semi-static communications.

Aspect 20: The method of Aspect 19, wherein only incrementing the value of the HARQ identifier for the first one or more communications is further associated with the resources associated with the first one or more communications not overlapping in the time domain with: a slot or symbol that is associated with a conflicting communication direction, a flexible slot or symbol that is associated with a synchronization signal block (SSB) communication, or a slot or symbol that is associated with a search space that is associated with initial access or synchronization.

Aspect 21: The method of Aspect 20, further comprising: transmitting a time division duplexing (TDD) configuration indicating a pattern of communication directions for slots or symbols, the conflicting communication direction being indicated by the TDD configuration.

Aspect 22: The method of any of Aspects 19-21, wherein the HARQ identifier is associated with the period and is associated with a HARQ identifier offset value, a symbol associated with the period, and a periodicity associated with the multiple semi-static communications.

Aspect 23: The method of Aspect 22, further comprising: assigning the HARQ identifier to a communication, from the first one or more communications, that occurs first in the time domain; and incrementing the HARQ identifier only for the first one or more communications.

Aspect 24: The method of any of Aspects 19-23, wherein the multiple semi-static communications include multiple semi-persistent scheduling (SPS) communications or multiple configured grant (CG) communications.

Aspect 25: The method of any of Aspects 14-24, further comprising: receiving an indication, associated with the UE, that a communication, from the multiple communications or the first one or more communications, is not to be transmitted by the UE; and skipping, associated with receiving the indication, an increment or assignment of the HARQ identifier for the communication.

Aspect 26: The method of any of Aspects 14-25, wherein the one or more time domain resources associated with the CLI measurements include at least one of: a first one or more symbols associated with measuring CLI, or a second one or more symbols before or after the first one or more symbols.

Aspect 27: An apparatus for wireless communication at a device, comprising a processor; memory coupled with the processor; and instructions stored in the memory and executable by the processor to cause the apparatus to perform the method of one or more of Aspects 1-13.

Aspect 28: A device for wireless communication, comprising a memory and one or more processors coupled to the memory, the one or more processors configured to perform the method of one or more of Aspects 1-13.

Aspect 29: An apparatus for wireless communication, comprising at least one means for performing the method of one or more of Aspects 1-13.

Aspect 30: A non-transitory computer-readable medium storing code for wireless communication, the code comprising instructions executable by a processor to perform the method of one or more of Aspects 1-13.

Aspect 31: A non-transitory computer-readable medium storing a set of instructions for wireless communication, the set of instructions comprising one or more instructions that, when executed by one or more processors of a device, cause the device to perform the method of one or more of Aspects 1-13.

Aspect 32: An apparatus for wireless communication at a device, comprising a processor; memory coupled with the processor; and instructions stored in the memory and executable by the processor to cause the apparatus to perform the method of one or more of Aspects 14-26.

Aspect 33: A device for wireless communication, comprising a memory and one or more processors coupled to the memory, the one or more processors configured to perform the method of one or more of Aspects 14-26.

Aspect 34: An apparatus for wireless communication, comprising at least one means for performing the method of one or more of Aspects 14-26.

Aspect 35: A non-transitory computer-readable medium storing code for wireless communication, the code comprising instructions executable by a processor to perform the method of one or more of Aspects 14-26.

Aspect 36: A non-transitory computer-readable medium storing a set of instructions for wireless communication, the set of instructions comprising one or more instructions that, when executed by one or more processors of a device, cause the device to perform the method of one or more of Aspects 14-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. An apparatus for wireless communication at a user equipment (UE), comprising:

at least one memory storing processor-executable code; and at least one processor coupled with the at least one memory, the at least one processor configured to cause the apparatus to:

receive, from a network node, a configuration associated with cross-link interference (CLI), the configuration indicating one or more time domain resources associated with CLI measurements;

receive, from the network node, scheduling information associated with scheduling multiple communications, the scheduling information identifying a hybrid automatic repeat request (HARQ) identifier, and the scheduling information indicating that:

resources associated with a first one or more communications, of the multiple communications, do not overlap in a time domain with the one or more time domain resources, and resources associated with a second one or more communications, of the multiple communications, at least partially overlap in the time domain with the one or more time domain resources associated with the CLI measurements;

communicate, with the network node, the first one or more communications, the first one or more communications being associated with respective HARQ identifiers that are identified by incrementing a value of the HARQ identifier only for the first one or more communications;

skip a HARQ identifier increment and assignment for the second one or more communications;

wherein the multiple communications include multiple semi-static communications, and the scheduling information includes configuration information indicating a period associated with the multiple semi-static communications.

2. The UE of claim 1, wherein the scheduling information includes downlink control information scheduling the multiple communications.

3. The UE of claim 1, wherein the multiple communications include:

multiple physical downlink shared channel (PDSCH) communications, or multiple physical uplink shared channel (PUSCH) communications.

4. The UE of claim 1, wherein the at least one processor is further operable to cause the UE to:

transmit, to the network node, an indication that a communication, from the multiple communications or the first one or more communications, is not to be transmitted by the UE; and skip an increment or assignment of the HARQ identifier for the communication.

5. The UE of claim 1, wherein the one or more time domain resources associated with the CLI measurements include at least one of: a first one or more symbols associated with measuring CLI, or a second one or more symbols before or after the first one or more symbols.

6. An apparatus for wireless communication at a network node, comprising:

at least one memory; and at least one processor coupled with the at least one memory, the at least one processor configured to cause the apparatus to:

transmit a configuration, for a user equipment (UE), associated with cross-link interference (CLI), the configuration indicating one or more time domain resources associated with CLI measurements;

transmit scheduling information, for the UE, associated with scheduling multiple communications, the scheduling information identifying a hybrid automatic repeat request (HARQ) identifier, and the scheduling information indicating that:

resources associated with a first one or more communications, of the multiple communications, do not overlap in a time domain with the one or more time domain resources, and resources associated with a second one or more communications, of the multiple communications, at least partially overlap in the time domain with the one or more time domain resources associated with the CLI measurements;

communicate the first one or more communications associated with the UE, the first one or more communications being associated with respective HARQ identifiers that are identified by incrementing a value of the HARQ identifier only for the first one or more communications; and skip a HARQ identifier incrementation and assignment for the second one or more communications;

wherein the multiple communications include multiple semi-static communications, and the scheduling information includes configuration information indicating a period associated with the multiple semi-static communications.

7. The network node of claim 6, wherein the scheduling information includes downlink control information scheduling the multiple communications.

8. The network node of claim 6, wherein the multiple communications include:

multiple physical downlink shared channel (PDSCH) communications, or multiple physical uplink shared channel (PUSCH) communications.

9. The network node of claim 6, wherein the at least one processor is further operable to cause the network node to:

receive an indication, associated with the UE, that a communication, from the multiple communications or the first one or more communications, is not to be transmitted by the UE; and skip, associated with receiving the indication, an increment or assignment of the HARQ identifier for the communication.

10. The network node of claim 6, wherein the one or more time domain resources associated with the CLI measurements include at least one of:

a first one or more symbols associated with measuring CLI, or a second one or more symbols before or after the first one or more symbols.

11. A method of wireless communication performed by an apparatus of a user equipment (UE), comprising:

receiving, from a network node, a configuration associated with cross-link interference (CLI), the configuration indicating one or more time domain resources associated with CLI measurements;

receiving, from the network node, scheduling information associated with scheduling multiple communications, the scheduling information associated with a hybrid automatic repeat request (HARQ) identifier, and the scheduling information indicating that:

resources associated with a first one or more communications, of the multiple communications, do not overlap in a time domain with the one or more time domain resources, and resources associated with a second one or more communications, of the multiple communications, at least partially overlap in the time domain with the one or more time domain resources associated with the CLI measurements; and communicating, with the network node, the first one or more communications, the first one or more communications being associated with respective HARQ identifiers that are identified by incrementing a value of the HARQ identifier only for the first one or more communications; and skipping a HARQ identifier increment and assignment for the second one or more communications;

wherein the multiple communications include multiple semi-static communications, and the scheduling information includes configuration information indicating a period associated with the multiple semi-static communications.

12. The method of claim 11, wherein only incrementing the value of the HARQ identifier for the first one or more communications is further associated with the resources associated with the first one or more communications not overlapping in the time domain with:

a slot or symbol that is associated with a conflicting communication direction, a flexible slot or symbol that is associated with a synchronization signal block (SSB) communication, or a slot or symbol that is associated with a search space that is associated with initial access or synchronization.

13. The method of claim 12, further comprising:

receiving a time division duplexing (TDD) configuration indicating a pattern of communication directions for slots or symbols, the conflicting communication direction being indicated by the TDD configuration.

14. The method of claim 11, wherein the HARQ identifier is associated with the period and is associated with a HARQ identifier offset value, a symbol associated with the period, and a periodicity associated with the multiple semi-static communications.

15. The method of claim 14, further comprising:

assigning the HARQ identifier to a communication, from the first one or more communications, that occurs first in the time domain; and incrementing the HARQ identifier only for the first one or more communications.

16. The method of claim 11, wherein the multiple semi-static communications include multiple semi-persistent scheduling (SPS) communications or multiple configured grant (CG) communications.

17. A method of wireless communication performed by an apparatus of a network node, comprising:

transmitting a configuration, for a user equipment (UE), associated with cross-link interference (CLI), the configuration indicating one or more time domain resources associated with CLI measurements;

transmitting scheduling information, for the UE, associated with scheduling multiple communications, the scheduling information associated with a hybrid automatic repeat request (HARQ) identifier, and the scheduling information indicating that:

resources associated with a first one or more communications, of the multiple communications, do not overlap in a time domain with the one or more time domain resources, and resources associated with a second one or more communications, of the multiple communications, at least partially overlap in the time domain with the one or more time domain resources associated with the CLI measurements;

communicating the first one or more communications associated with the UE, the first one or more communications being associated with respective HARQ identifiers that are identified by incrementing a value of the HARQ identifier only for the first one or more communications; and skipping a HARQ identifier incrementation and assignment for the second one or more communications;

wherein the multiple communications include multiple semi-static communications, and the scheduling information includes configuration information indicating a period associated with the multiple semi-static communications.

18. The method of claim 17, wherein only incrementing the value of the HARQ identifier for the first one or more communications is further associated with the resources associated with the first one or more communications not overlapping in the time domain with:

a slot or symbol that is associated with a conflicting communication direction, a flexible slot or symbol that is associated with a synchronization signal block (SSB) communication, or a slot or symbol that is associated with a search space that is associated with initial access or synchronization.

19. The method of claim 18, further comprising:

transmitting a time division duplexing (TDD) configuration indicating a pattern of communication directions for slots or symbols, the conflicting communication direction being indicated by the TDD configuration.

20. The method of claim 17, wherein the HARQ identifier is associated with the period and is associated with a HARQ identifier offset value, a symbol associated with the period, and a periodicity associated with the multiple semi-static communications.

21. The method of claim 20, further comprising:

assigning the HARQ identifier to a communication, from the first one or more communications, that occurs first in the time domain; and incrementing the HARQ identifier only for the first one or more communications.

22. The method of claim 17, wherein the multiple semi-static communications include multiple semi-persistent scheduling (SPS) communications or multiple configured grant (CG) communications.

23. The method of claim 17, wherein the one or more time domain resources associated with the CLI measurements include at least one of:

a first one or more symbols associated with measuring CLI, or a second one or more symbols before or after the first one or more symbols.

24. The apparatus of claim 1, wherein the scheduling information further identifies a modulation and coding scheme (MCS) for the first one or more communications.

25. The apparatus of claim 1, wherein the configuration associated with CLI measurements comprises a periodicity and a slot offset for the time domain resources.

26. The apparatus of claim 1, wherein the at least one processor is further configured to cause the apparatus to buffer data associated with the first one or more communications according to the respective HARQ identifiers.

27. The apparatus of claim 1, wherein the scheduling information further identifies a frequency domain resource assignment for the first one or more communications.

28. The apparatus of claim 6, wherein the network node is further configured to transmit an indication to the UE that the second one or more communications are invalid due to overlap with the CLI measurement resources.

29. The method of claim 11, wherein receiving the configuration comprises receiving, via radio resource control (RRC) signaling, a measurement configuration for CLI measurements.

30. The apparatus of claim 6, wherein the at least one processor is further operable to cause the network node to determine a quantity of HARQ processes allocated for the period associated with the multiple semi-static communications.

* * * * *